US011657597B2

(12) United States Patent
Guan et al.

(10) Patent No.: US 11,657,597 B2
(45) Date of Patent: *May 23, 2023

(54) CLOUD DETECTION ON REMOTE SENSING IMAGERY

(71) Applicant: CLIMATE LLC, Saint Louis, MO (US)

(72) Inventors: Wei Guan, Fremont, CA (US); Pramithus Khadka, Saint Louis, MO (US); Jeffrey Gerard, Seattle, WA (US)

(73) Assignee: CLIMATE LLC, Saint Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/409,278

(22) Filed: Aug. 23, 2021

(65) Prior Publication Data

US 2021/0383156 A1    Dec. 9, 2021

Related U.S. Application Data

(63) Continuation of application No. 16/818,428, filed on Mar. 13, 2020, now Pat. No. 11,126,886, which is a
(Continued)

(51) Int. Cl.
*G06V 10/60* (2022.01)
*G06K 9/62* (2022.01)
(Continued)

(52) U.S. Cl.
CPC .......... *G06V 10/60* (2022.01); *G06F 18/2148* (2023.01); *G06F 18/24* (2023.01);
(Continued)

(58) Field of Classification Search
CPC ........ G06V 10/60; G06V 10/30; G06V 10/42; G06V 10/56; G06V 20/13; G06V 20/194;
(Continued)

(56) References Cited

U.S. PATENT DOCUMENTS

| 5,612,901 A | 3/1997 | Gallegos |
| 7,184,892 B1 | 2/2007 | Dyer et al. |

(Continued)

OTHER PUBLICATIONS

Argentina Patent Office, "Office Action", in Application No. 20160103740, dated Jun. 16, 2021, 6 pages.
(Continued)

*Primary Examiner* — Casey L Kretzer
(74) *Attorney, Agent, or Firm* — Harness, Dickey & Pierce, P.L.C.

(57) ABSTRACT

A system for detecting clouds and cloud shadows is described. In one approach, clouds and cloud shadows within a remote sensing image are detected through a three step process. In the first stage a high-precision low-recall classifier is used to identify cloud seed pixels within the image. In the second stage, a low-precision high-recall classifier is used to identify potential cloud pixels within the image. Additionally, in the second stage, the cloud seed pixels are grown into the potential cloud pixels to identify clusters of pixels which have a high likelihood of representing clouds. In the third stage, a geometric technique is used to determine pixels which likely represent shadows cast by the clouds identified in the second stage. The clouds identified in the second stage and the shadows identified in the third stage are then exported as a cloud mask and shadow mask of the remote sensing image.

20 Claims, 11 Drawing Sheets

Related U.S. Application Data continuation of application No. 16/193,646, filed on Nov. 16, 2018, now Pat. No. 10,621,467, which is a continuation of application No. 15/666,347, filed on Aug. 1, 2017, now Pat. No. 10,140,546, which is a continuation of application No. 14/960,921, filed on Dec. 7, 2015, now Pat. No. 9,721,181.

(51) Int. Cl.
| | |
|---|---|
| G06V 10/30 | (2022.01) |
| G06V 10/42 | (2022.01) |
| G06V 10/56 | (2022.01) |
| G06V 20/13 | (2022.01) |
| G06V 30/24 | (2022.01) |
| G06T 7/60 | (2017.01) |
| G06T 7/194 | (2017.01) |
| G06V 20/10 | (2022.01) |
| G06F 18/24 | (2023.01) |
| G06F 18/20 | (2023.01) |
| G06F 18/214 | (2023.01) |
| G06F 18/2411 | (2023.01) |

(52) U.S. Cl.
CPC ........ *G06F 18/2411* (2023.01); *G06F 18/285* (2023.01); *G06T 7/194* (2017.01); *G06T 7/60* (2013.01); *G06V 10/30* (2022.01); *G06V 10/42* (2022.01); *G06V 10/56* (2022.01); *G06V 20/13* (2022.01); *G06V 30/248* (2022.01); *G06T 2207/30192* (2013.01); *G06V 20/194* (2022.01); *G06V 30/2528* (2022.01)

(58) Field of Classification Search
CPC ............. G06V 30/248; G06V 30/2528; G06K 9/6227; G06K 9/6257; G06K 9/6267; G06K 9/6269; G06T 7/194; G06T 7/60; G06T 2207/30192
See application file for complete search history.

(56) References Cited

U.S. PATENT DOCUMENTS

| | | |
|---|---|---|
| 8,443,822 B2 | 5/2013 | Ivans |
| 8,594,375 B1 | 11/2013 | Padwick |
| 2004/0064464 A1 | 4/2004 | Forman et al. |
| 2005/0100220 A1 | 5/2005 | Keaton |
| 2005/0111692 A1 | 5/2005 | Boright et al. |
| 2005/0114026 A1 | 5/2005 | Boright |
| 2005/0175253 A1 | 8/2005 | Li |
| 2009/0232349 A1 | 9/2009 | Moses et al. |
| 2010/0094481 A1 | 4/2010 | Anderson |
| 2013/0004065 A1 | 1/2013 | Ma |
| 2013/0064420 A1 | 3/2013 | Amin |
| 2013/0173321 A1 | 7/2013 | Johnson |
| 2013/0174040 A1 | 7/2013 | Johnson |
| 2015/0161768 A1 | 6/2015 | Ardouin |
| 2017/0161584 A1 | 6/2017 | Guan |
| 2017/0357872 A1 | 12/2017 | Guan et al. |
| 2019/0087682 A1 | 3/2019 | Guan |
| 2020/0218930 A1 | 7/2020 | Guan |

OTHER PUBLICATIONS

Argentina Claims, in Application No. 20160103740, dated Jun. 16, 2021, 9 pages.

Zammit Olivier et al., "Combining one-class support vector machines and hysteresis thresholding: Application to burnt area mapping" European Signal Processing Conference, IEEE, Aug. 2008, 5 pages.

Ukrainian Institute of Intellectual Property, "Preliminary conclusion of the substantial examination", in application No. a 2018 07705, dated Nov. 12, 2020, 3 pages.

Ukrainian Claims in application No. a 2018 07705, dated Nov. 2020, 9 pages.

The International Bureau of WIPO, "International Preliminary Report on Patentability" in application No. PCT/US2016/061990, dated Feb. 6, 2017, 5 pages.

Sedano, et al., "A Cloud Mask Methodology for High Resolution Remote Sensing Data Combining Information for High and Medium Resolution Optical Sensors", ISPRS Journal, 2011, 9 pages.

Laban et al., "Spatial Cloud Detection and Retrieval Systems for Satellite Images", International Journal of Advanced Computer Science and Applications, vol. 3, No. 12, dated Jan. 8, 2016 7 pages.

International Searching Authority, "Search Report" in application No. PCT/US16/61990, dated Feb. 6, 2017, 7 pages.

Goodwin et al., "Cloud and Cloud Shadow Screening Across Queensland, Australia: An Automated Method for Landsat TM/ETM+ Time Series", Remote Sensing of Environment, dated Mar. 25, 2013, 16 pages.

European Patent Office, "Search Report" in application No. 15 838 946.0-1213, dated Jan. 20, 2020, 8 pages.

European Claims in application No. 15 838 946.0-1213, dated Jan. 2020, 4 pages.

Danneels et al., "Automatic landslide detection from remote sensing images using supervised classification methods", IEEE, dated Aug. 2007, 5 pages.

Current Claims in application No. PCT/US2016/061990, dated Feb. 2017, 9 pages.

Brazil Patent Office, "Office Action", in application No. 1120180114588, dated May 26, 2020, 2 pages.

Brazil Claims in application No. 1120180114588, dated May 2020.

Guan, U.S. Appl. No. 16/193,646, filed Nov. 16, 2018, Office Action, dated Aug. 20, 2019.

Guan, U.S. Appl. No. 16/193,646, filed Nov. 16, 2018, Notice of Allowance, dated Dec. 18, 2019.

Guan, U.S. Appl. No. 15/666,347, filed Aug. 1, 2017, Office Action, dated Mar. 29, 2018.

Guan, U.S. Appl. No. 15/666,347, filed Aug. 1, 2017, Notice of Allowance, dated Aug. 13, 2018.

Guan, U.S. Appl. No. 14/960,921, filed Dec. 7, 2015, Office Action, dated Mar. 6, 2017.

Guan, U.S. Appl. No. 14/960,921, filed Dec. 7, 2015, Notice of Allowance, dated Apr. 13, 2017.

Levner et al., "Classification-Driven Watershed Segmentationn", IEEE Transactions on Image Processing, IEEE Service Center, Piscataway, NJ, US, vol. 16, No. 5. (May 1, 2007) (9 pages).

Beuchle, et al., "Updating an Object-Based Pan-Tropical Forest Cover Change Assessment By Automatic Change Detection and Classification" Proceedings of the 4th GEOBIA, Rio de Janeiro, BR. (May 7, 2012) (6 pages).

Fig. 2
(a)
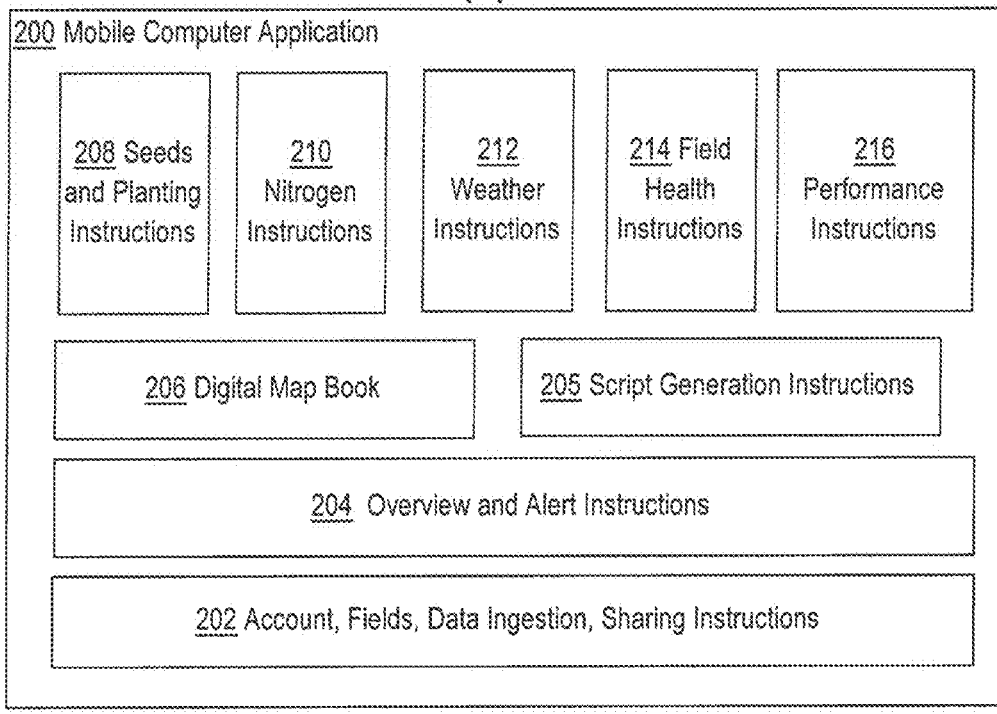
(b)
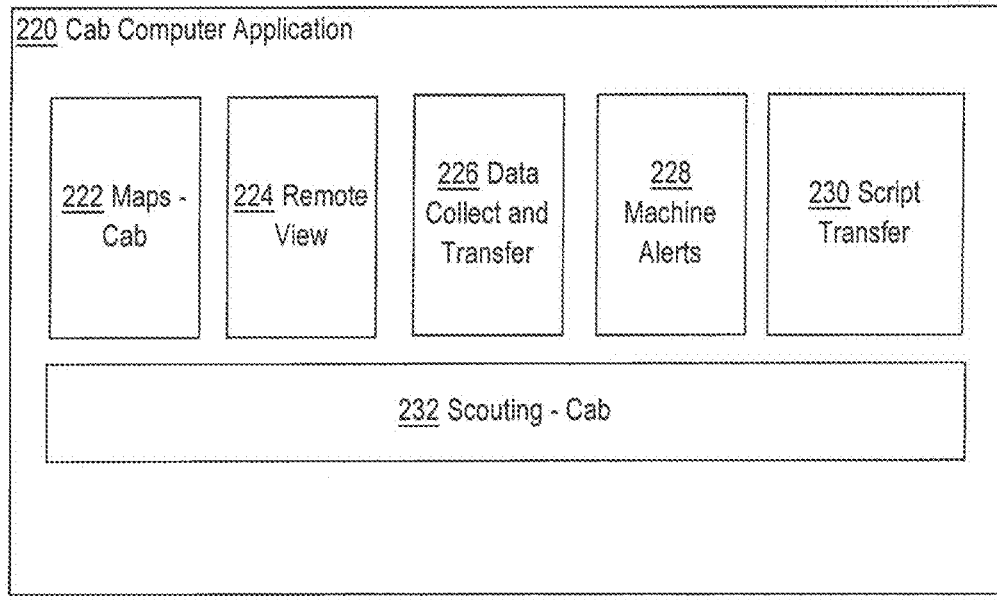

CLOUD DETECTION ON REMOTE SENSING IMAGERY

BENEFIT CLAIM

This application claims the benefit under 35 U.S.C. § 120 as a Continuation of application Ser. No. 16/818,428, filed Mar. 13, 2020, which is a continuation of application Ser. No. 16/193,646, filed Nov. 16, 2018, now U.S. Pat. No. 10,621,467 B2, which is a continuation of application Ser. No. 15/666,347, filed Aug. 1, 2017, now U.S. Pat. No. 10,140,546 B2, issued on Nov. 27, 2018, which is a continuation of application Ser. No. 14/960,921, filed Dec. 7, 2015, now U.S. Pat. No. 9,721,181 B2, issued on Aug. 1, 2017, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 The Climate Corporation.

FIELD OF THE DISCLOSURE

The present disclosure relates to computer-based systems that are programmed for detecting clouds in remote sensing imagery. More specifically, the present disclosure relates to using a hybrid of data-driven and clustering methods in computer programs or electronic digital data processing apparatus for cloud detection in remote sensing imagery.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In many cases, clouds in the atmosphere partially or fully obscure a satellite sensor's view of the Earth's surface. The clouds may also cast shadows on the ground where less sunlight is reflected to the sensor. In both cases, the clouds limit the information a remote sensing observer may obtain about the surface and compromise estimates of physical parameters obtained from the sensors. For many applications of remotely sensed imagery, it is therefore critical to be able to identify these affected pixels, usually for exclusion from analysis. It is conventional to distribute alongside the imagery a separate raster band called a "mask", containing discrete categorical values for each pixel location. For example, a binary mask that marks each pixel as usable versus compromised, cloud vs. ground, shadow vs. not shadow, and so forth.

The remote sensing community has proposed many cloud detection methods. For example, the Automated Cloud Cover Assignment (ACCA) system applies a number of spectral filters with pre-selected thresholds and works well for estimating the overall percentage of clouds in each scene. However, the ACCA system does not provide the cloud locations within the image, which is important for developing a mask for automated land analysis. The Landsat Ecosystem Disturbance Adaptive Processing System (LEDAPS) uses a two pass algorithm that includes a thermal test which generates a mask for clouds. Besides thermal bands, the algorithm also requires other ancillary data such as surface temperate. The Fmask algorithm applies rules based on physical properties to reflectance and brightness temperature (BT) to derive a potential cloud layer. Application-based thresholds can be specified by users to make their own decisions for defining a cloud region. However, the aforementioned techniques rely on thermal bands, which are not available in some types of satellite images, such as Rapid-Eye images which presently provide data for only the visible and near-infrared (NIR) bands. Another technique is to employ a random forest model on a designated 2D histogram of band indices. The aforementioned method achieves good performance, but only provides cloud masks for low-resolution patches of 100 m by 100 m rather than at the level of individual pixels. Another technique is to use a time series of multiple scenes captured to model a pixel's biophysical change over time and to detect clouds as high-valued outliers. However, this method requires the images of the monitored area to be taken multiple times over a relatively short time period. Therefore, the aforementioned technique cannot be applied effectively to temporarily sparse images. For example, satellite image providers are not always capable of taking images of an area on demand, for instance due to the availability of a satellite with proper positioning, thus there may be a significant delay from one image to the next.

Shadows cast by thick clouds on the ground also interfere with most remote sensing applications by reducing the amount of light reflected to the satellite sensor. Simple pixel-based detection methods often falsely identify dark surfaces as cloud shadows or exclude shadows that are not dark enough. Geometry-based sensor techniques can avoid such problems and identify shadows more accurately, although those techniques often rely on a robust and accurate cloud detection process. One technique is to use lapse rate to estimate cloud top height and use the cloud pixels to cast shadows. This method works well for thick clouds, but is not accurate when the clouds are semitransparent. Another technique uses the scattering differences between short wavelength and NIR bands to produce shadow masks in Moderate Resolution Imaging Spectroradiometer (MODIS) images. However, this technique is less accurate when the shadow falls on bright surfaces or is generated by an optically thin cloud.

SUMMARY OF THE DISCLOSURE

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 10 depicts an example embodiment of a timeline view for data entry.

FIG. 11 depicts an example embodiment of a spreadsheet view for data entry.

DETAILED DESCRIPTION

Figure 1:
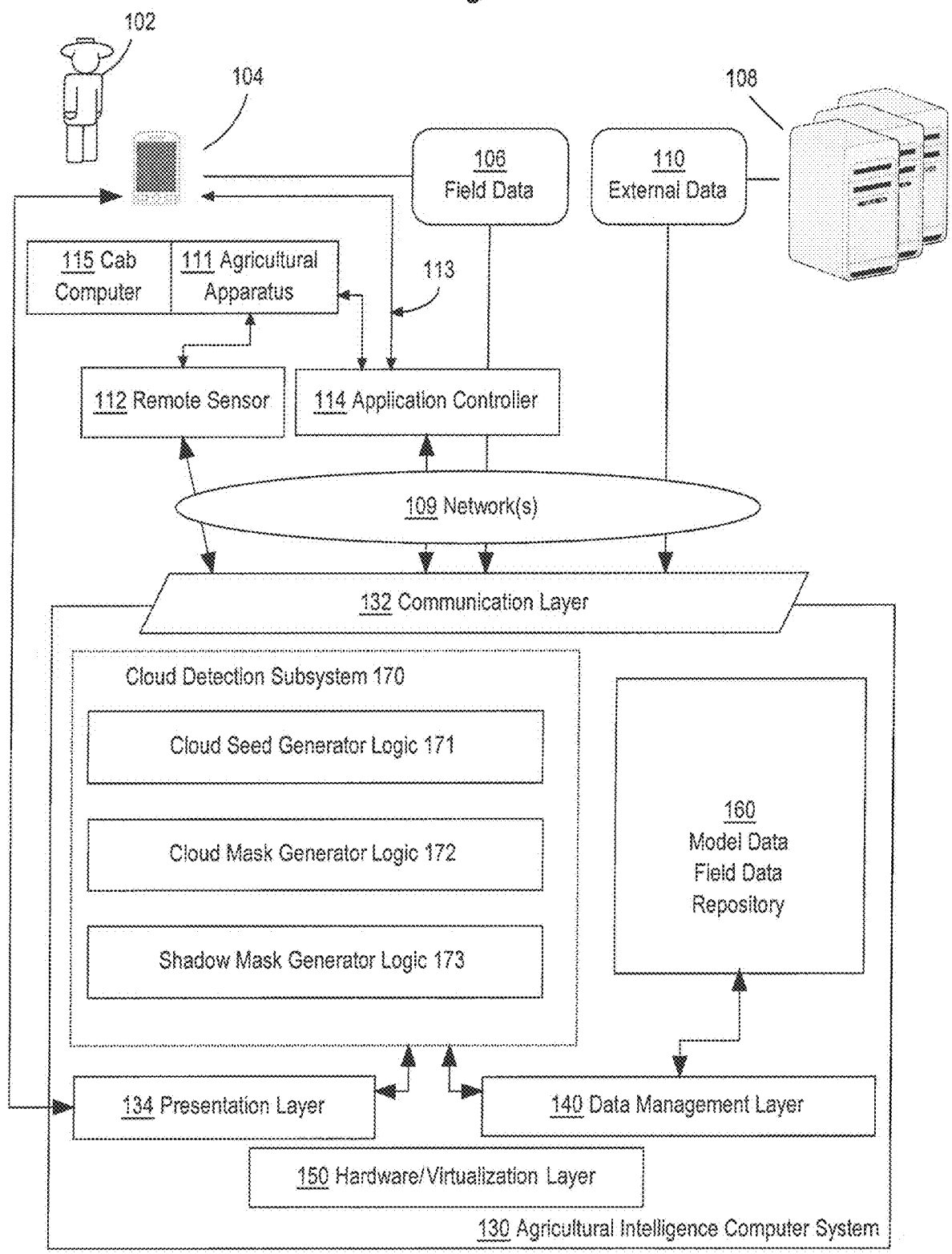
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. The description is provided according to the following outline:

1.0 General Overview
2.0 Example Agricultural Intelligence Computer System
    2.1 Structural Overview
    2.2 Application Program Overview
    2.3 Data Ingest to the Computer System
    2.4 Process Overview—Agronomic Model Training
    2.5 Cloud Detection Subsystem
        2.5.1 Cloud Seed Generator Logic
        2.5.2 Cloud Mask Generator Logic
        2.5.3 Shadow Mask Generator Logic
    2.6 Implementation Example—Hardware Overview
3.0 Example System Inputs
    3.1 Remote Sensing Data
4.0 Classifier Overview
    4.1 Feature Selection
    4.2 Preparing Ground Truth Data
5.0 Analysis Triggers and Use Cases
6.0 Cloud Seed Generator
7.0 Cloud Mask Generator
    7.1 Region Growing
8.0 Shadow Mask Generator
9.0 Haze Detection
10.0 Extensions and Alternatives
11.0 Additional Disclosure
1.0 General Overview Aspects of this disclosure focus on the problem of detecting clouds and cloud shadows in remote sensing images and provide data processing systems, including programmed computers and other digital data processing apparatus that are programmed to detect clouds and cloud shadows using remote sensing images that have been stored in electronic digital data storage.

The cloud and shadow detection techniques described herein can be conceptually divided into three logical stages that can be embodied in three broad sets of instructions for a programmed computer or three sets of digital circuitry. The cloud and shadow detection techniques will be described in reference to these three stages. However, other embodiments may logically divide the process into virtually any number of stages. Furthermore, there is no requirement that the steps described in relation to each stage must necessarily be performed in the order presented.

The first stage uses a high-precision, low-recall classifier on a remote sensing image to identify cloud seeds, which represent pixels that are highly likely to be clouds within the image. Clear pixels misclassified as clouds (errors of commission) are usually spatially isolated and are removed by applying morphological image processing techniques.

In the context of statistics, for a given class, precision refers to the ratio of correct classifications of that class vs. the total number of classifications of that class. Recall refers to the ratio of correct classifications for that class vs. the total number of that class in the dataset. For example, if a dataset contains 7 cloud pixels and 3 non-cloud pixels, a classifier that identifies each pixel in the dataset as a cloud pixel would have 100% recall for cloud pixels, but only 70% precision. Thus, a high-precision low-recall classifier identifies pixels that have a very high chance to be clouds, but may experience a large number of false negatives and therefore misclassify some cloud pixels as non-cloud pixels. Furthermore, a low-precision high-recall classifier has a high probability of correctly identifying all the cloud pixels in the image, but may include many false positives which misclassify some non-cloud pixels as cloud pixels.

In the second stage, candidate cloud pixels are extracted with a low-precision high-recall classifier. Morphological image processing techniques are then applied to the extracted candidate cloud pixels to remove false positives. However, despite the morphological image processing, the high-recall low-precision classifier may still contain a large number of false positives. A clustering technique is then used to grow the cloud seeds into regions representing the candidate clouds, resulting in a cloud mask. Since cloud pixels are often clustered around other cloud pixels, the cloud seeds (which represent pixels that are highly likely to be clouds) can therefore be used to prune away disconnected candidate cloud pixels that are likely to have been included in the candidate cloud pixels as false positives. In effect, this process removes any candidate cloud pixel that is not connected (directly or indirectly through other candidate cloud pixels) to a cloud seed from being classified as a cloud. The result is a cloud mask that identifies each cloud pixel within the remote sensing image.

The third stage of the pipeline detects cloud shadows using the aforementioned cloud mask as input. Specifically, the third stage uses geometry based techniques to estimate based on the position of the clouds, satellite viewing angle, and the source of light (e.g. the Sun) where shadows are likely to be found. However, the aforementioned geometry based techniques require the height of the clouds in order to determine the shadow position. To estimate the height of the clouds, candidate shadow pixels are identified using spectral analysis, such as identifying pixels where one or more bands (e.g. the NIR band) is below a particular threshold. By iterating the geometric based techniques on different cloud heights, the cloud height can be estimated by finding the height where the calculated shadow has the most overlap (e.g. in terms of number of pixels) with the NIR-thresholded candidate pixels. Once the shadows have been detected, the pixels representing shadow are then used to generate a shadow mask.

In some embodiments, the cloud and shadow mask is then used as input to other processes that extract information from remote sensing images. For example, the cloud and shadow masks can be used to filter out pixels that are not suitable for analysis. As another example, the cloud and shadow masks can be used to visually display the cloud and cloud shadow areas within the remote sensing image, such as by highlighting clouds and shadow using visually distinguished (e.g. different color) pixels that make those elements easier to visually perceive. There is no limit to the applications to which the techniques described herein may be applied.

Other features and aspect of the disclosure will become apparent in the drawings, description, and claims.

1. General Overview
2. Example Agricultural Intelligence Computer System
2.1 Structural Overview FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) pesticide data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 has one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines or harvesters. Application controller 114 is communicatively coupled to agricultural intelligence computer system 130 via the network(s) 109 and is programmed or configured to receive one or more scripts to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a color graphical screen display that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 10:
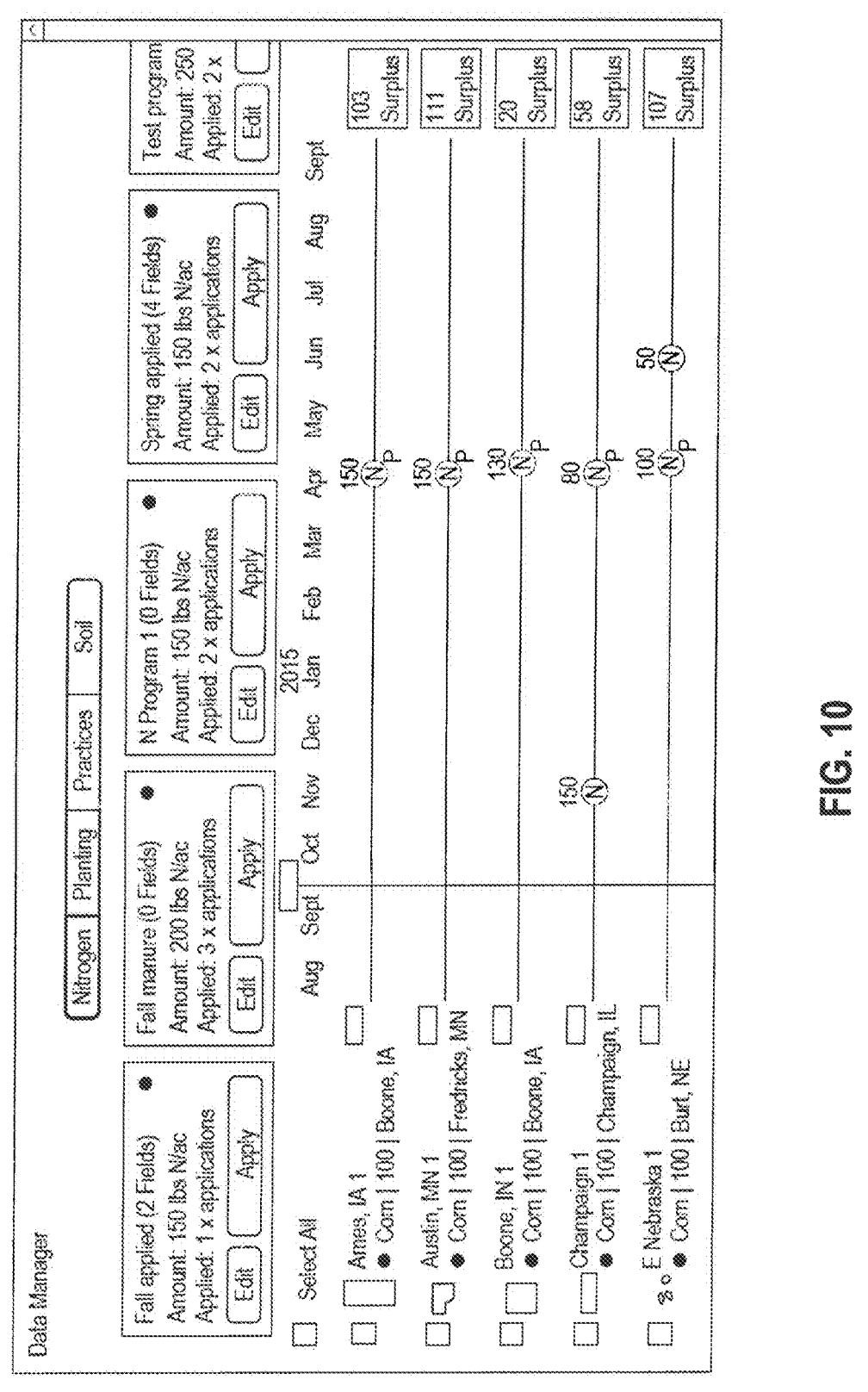

FIG. 10 depicts an example embodiment of a timeline view for data entry. Using the display depicted in FIG. 10, a user computer can input a selection of a particular field and a particular date for the addition of event. Events depicted at the top of the timeline include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 10, the top two timelines have the "Fall applied" program selected, which includes an application of 150 lbs N/ac in early April. The data manager may provide an interface for editing a program. In an embodiment, when a particular program is edited, each field that has selected the particular program is edited. For example, in FIG. 10, if the "Fall applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 10, the interface may update to indicate that the "Fall applied" program is no longer being applied to the top field. While the nitrogen application in early April may remain, updates to the "Fall applied" program would not alter the April application of nitrogen.

Figure 6:
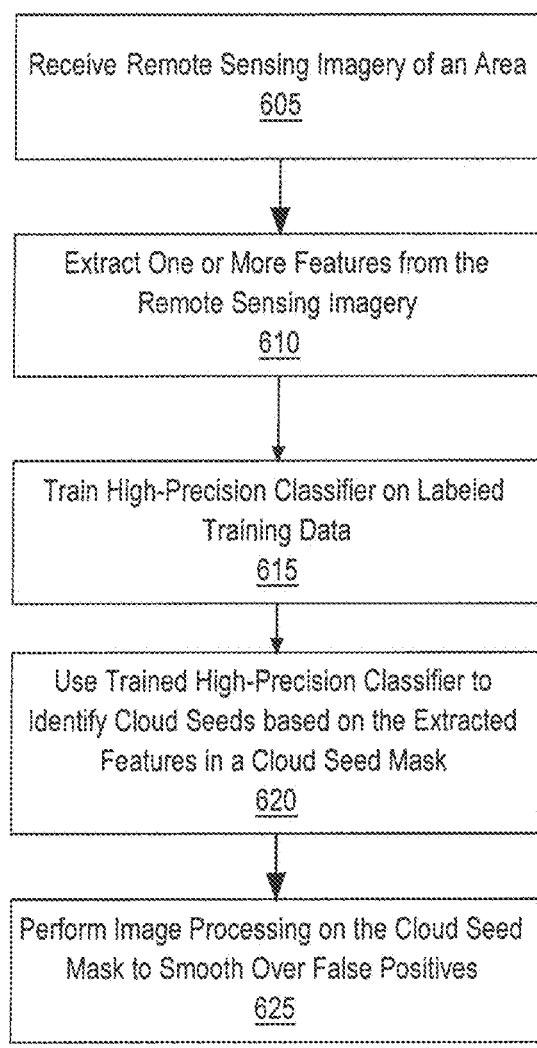
FIG. 6 illustrates an example process for identifying cloud seeds in remote sensing imagery according to an embodiment.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
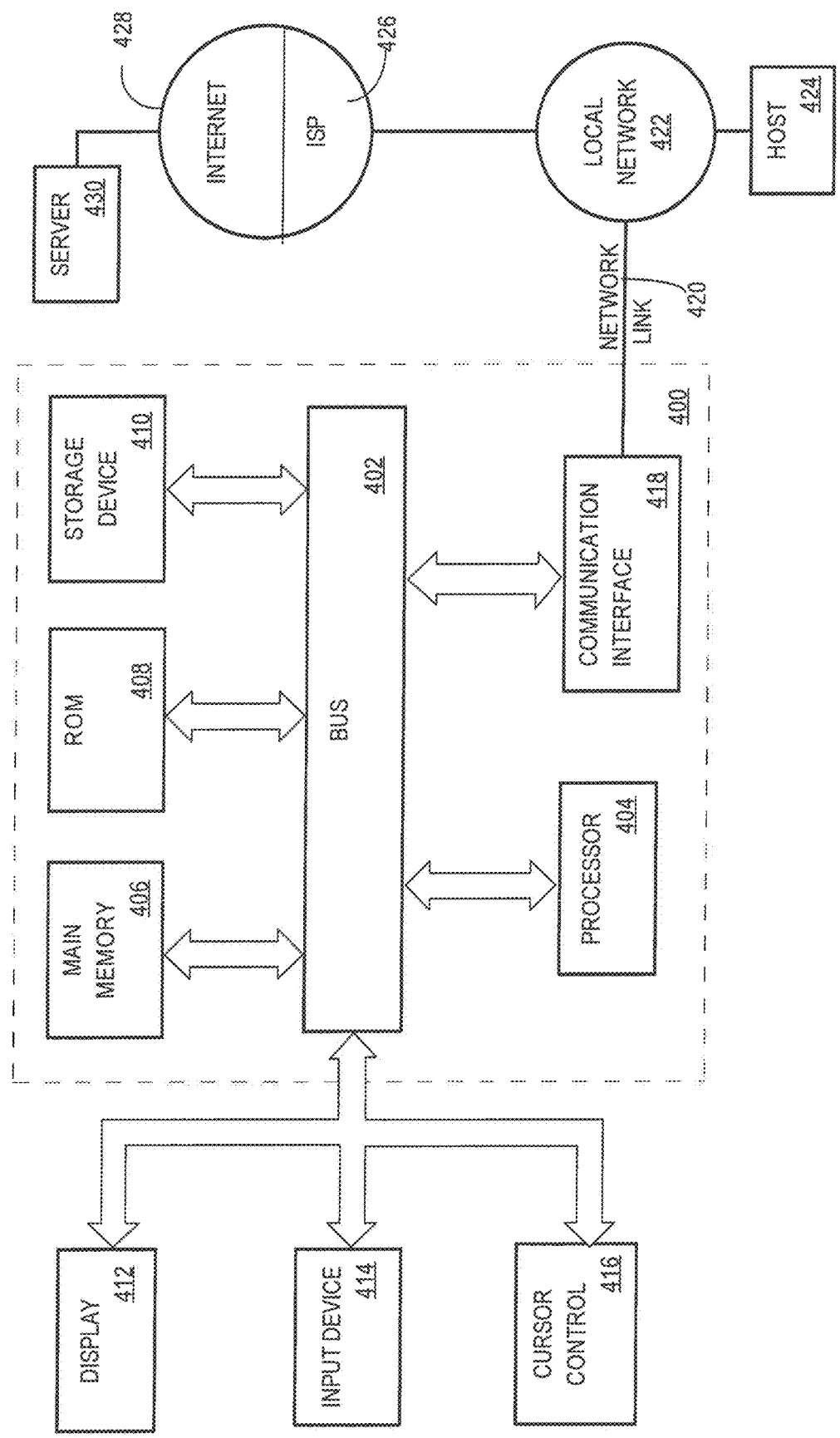
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account-fields-data ingestion-sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of application zones and/or images generated from subfield soil data, such as data obtained from sensors, at a high spatial resolution (as fine as 10 meters or smaller because of their proximity to the soil); upload of existing grower-defined zones; providing an application graph and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields that have been defined in the system; example data may include nitrogen application data that is the same for many fields of the same grower, but such mass data entry applies to the entry of any type of field data into the mobile computer application 200. For example, nitrogen instructions 210 may be programmed to accept definitions of nitrogen planting and practices programs and to accept user input specifying to apply those programs across multiple fields. "Nitrogen planting programs," in this context, refers to a stored, named set of data that associates: a name, color code or other identifier, one or more dates of application, types of material or product for each of the dates and amounts, method of application or incorporation such as injected or knifed in, and/or amounts or rates of application for each of the dates, crop or hybrid that is the subject of the application, among others. "Nitrogen practices programs," in this context, refers to a stored, named set of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium) application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, hybrid, population, SSURGO, soil tests, or elevation, among others. Programmed reports and analysis may include yield variability analysis, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at machine sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 230 may be programmed to display location-based alerts and information received from the system 130 based on the location of the agricultural apparatus 111 or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

2.4 Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, and harvesting recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge at the same location or an estimate of nitrogen content with a soil sample measurement.

Figure 3:
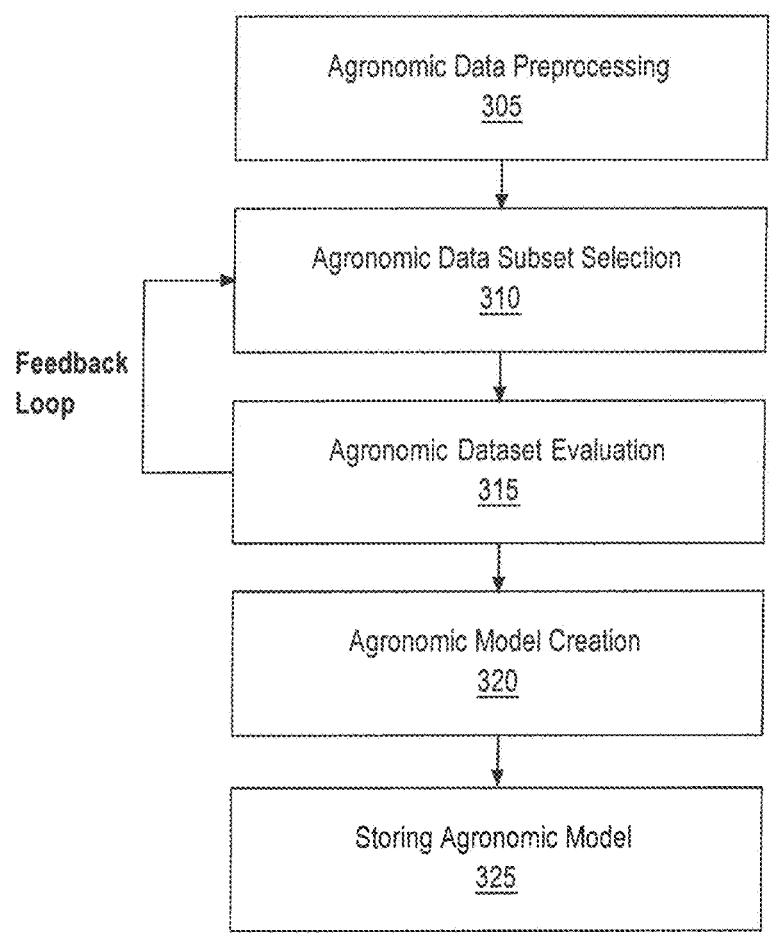
FIG. 3 illustrates a programmed process by which the agricultural intelligence computer system generates one or more preconfigured agronomic models using agronomic data provided by one or more external data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise and distorting effects within the agronomic data including measured outliers that would bias received field data values. Embodiments of agronomic data preprocessing may include, but are not limited to, removing data values commonly associated with outlier data values, specific measured data points that are known to unnecessarily skew other data values, data smoothing techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared using cross validation techniques including, but not limited to, root mean square error of leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5 Cloud Detection Subsystem

In an embodiment, the agricultural intelligence computer system 130, among other components, includes a cloud detection subsystem 170. The cloud detection subsystem 170 collects images and other information related to an area, such as an agricultural field, from the model data and field data repository 160 and/or external data 110 and determines which portions correspond to clouds and/or cloud shadows.

In an embodiment, the cloud detection subsystem 170 includes cloud seed generator logic 171, cloud mask generator logic 172, and shadow mask generator logic 173. Each of the cloud seed generator logic 171, cloud mask generator logic 172, and shadow mask generator logic 173 may comprise sets of instructions, such as methods, functions or subroutines, of one or more computer programs or other programming for the subsystem 170.

In an embodiment, the cloud seed generator logic 171 performs pixel-level classification using a high-precision, low-recall classifier to identify cloud seeds, which represent pixels that are highly likely to be clouds within the remote sensing image. Clear pixels misclassified as clouds (errors in commission) are usually spatially isolated and can be removed by applying morphological image processing techniques.

In an embodiment, the cloud mask generator logic 172 extracts cloud pixels with a low-precision high-recall classifier. Morphological image processing techniques are then applied to the extracted candidate cloud pixels to remove false positives. However, despite the morphological image processing, the high-recall low-precision classifier may still contain a large number of false positives. A clustering technique is then used to grow the cloud seeds into regions representing the candidate clouds, resulting in a cloud mask. Since cloud pixels are often clustered around other cloud pixels, the cloud seeds (which represent pixels that are highly likely to be clouds) can therefore be used to prune away disconnected candidate cloud pixels that are likely to have been included in the candidate cloud pixels as false positives. In effect, this process removes any candidate cloud pixel that is not connected (directly or indirectly through other candidate cloud pixels) to a cloud seed from being classified as a cloud. The result is a cloud mask that identifies each cloud pixel within the remote sensing image.

For brevity, the high-precision low-recall classifier is referred to as a "high-precision classifier" and the low-precision high-recall classifier is referred to as a "high-recall classifier". Ideally, there would only be one classifier that is both high-precision and high-recall, but in practice such a classifier can be extremely difficult to develop. However, by using multiple classifiers, one that is intentionally skewed to favor precision and another that is intentionally skewed to favor recall, combined with the base assumption that cloud pixels will often be clustered together in groups, a reasonably accurate classification can be deduced. The method used to intentionally skew the classifiers towards precision or recall is dependent on the type of classifier used, but often involves adjusting one or more coefficients used by the classifier. For example, Support Vector Machines (SVMs) can be skewed towards precision or recall by adjusting the per-class penalty. The term "high-precision" and "high-recall" is not intended to limit the techniques described herein to classifiers which achieve a threshold degree of precision or recall, but instead indicates which side the coefficients and/or other settings of the classifier favors relative to the other classifier.

In an embodiment, the shadow mask generator logic 173 identifies cloud shadows using the aforementioned cloud mask as input. Specifically, the third stage uses geometry based techniques to estimate based on the position of the clouds and the source of light (e.g. the Sun) where shadows are likely to be found. However, the aforementioned geometry based techniques require the height of the clouds in order to determine the shadow position. To estimate the height of the clouds, candidate shadow pixels are identified using spectral analysis, such as detecting that one or more bands (e.g. the NIR band) is below a particular threshold. By iterating the geometry algorithm on different cloud heights, the cloud height can be estimated by finding the height where the calculated shadow has the most overlap (e.g. in terms of number of pixels) with the NIR-thresholded candidate pixels. Once the shadows have been detected, the pixels representing shadow are then used to generate a shadow mask.

Figure 5:
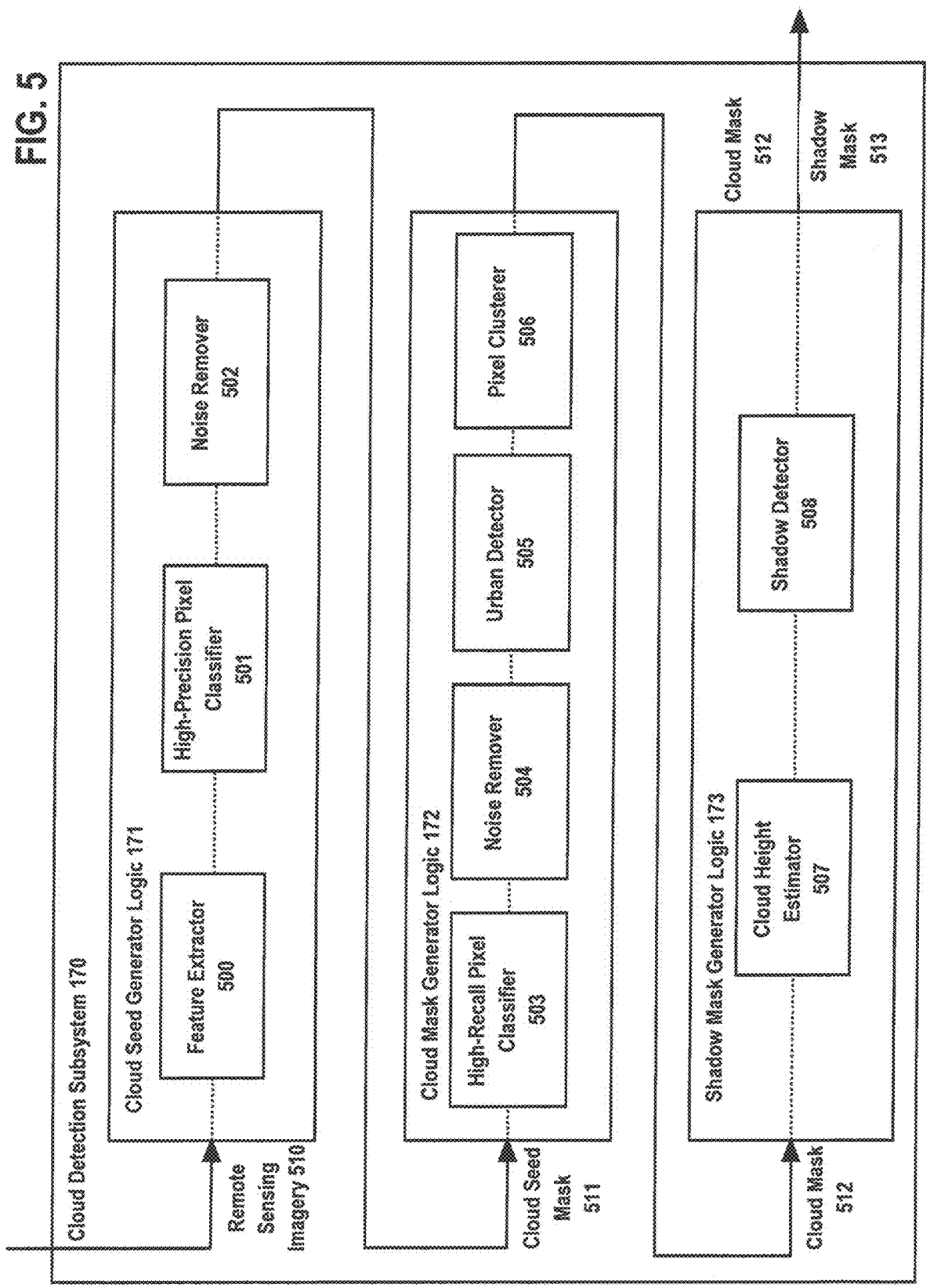
FIG. 5 illustrates an example layout for a cloud detection subsystem according to an embodiment.

FIG. 5 illustrates example details of the cloud detection subsystem 170 and related components according to an embodiment. Each element within FIG. 5 may comprise a set of programmed instructions, such as methods, functions or subroutines, of one or more computer programs, or firmware or other digital logic circuitry that is configured or programmed to cause digital processors to execute or perform the functions that are described herein for that element. Not all of the components depicted in FIG. 5 in relation to the cloud detection subsystem 170 are strictly necessary to perform the techniques described herein. Some of the components depicted in FIG. 5 may represent optional processing that in some cases may increase the accuracy of the overall classification process. However, the techniques described herein can be performed even in the absence of such components. For example, some embodiments of the urban detector 505 relies upon a time series of images of the analyzed area. Thus, in cases where the aforementioned time series is not available, the urban detector 505 may be omitted from the pipeline. As another example, if the photographed area is known to be rural with few to little urban areas, the urban detector 505 may not significantly increase the accuracy of the cloud classifications and may therefore be omitted. The input and output of the components depicted in FIG. 5 are not strictly limited to the inputs and outputs depicted. For example, some features described below with respect to the cloud mask generator logic 172 and shadow mask generator logic 173 use the remote sensing imagery 510. Thus, although not explicitly depicted, inputs from previous stages of the pipeline may also be passed along as inputs to later stages of the pipeline. As a result, the inputs and outputs illustrated in FIG. 5 depict only a subset of the actual inputs and outputs in order to avoid overly obscuring the illustration.

2.5.1 Cloud Seed Generator Logic

In FIG. 5, the cloud seed generator logic 171 includes a feature extractor 500, a high-precision pixel classifier 501, and a noise remover 502.

In an embodiment, the feature extractor 500 receives as input remote sensing imagery 510 and extracts features from the image for use by the high-precision pixel classifier 501. The exact features extracted from the image may vary depending on the exact classification technique employed by the high-precision pixel classifier 501. For example, different classification schemes may work better if the features include and/or exclude specific bands from the remote sensing imagery 510. Furthermore, the features extracted may be based on the type of remote sensing imagery 510 used. For example, features which correspond to information that is not present in and cannot be derived from remote sensing imagery 510 will often not be available for consideration in the classification process. However, in other embodiments the remote sensing imagery 510 may be supplemented by additional data and features extracted from different external sources.

In an embodiment, the high-precision pixel classifier 501 represents logic for performing classification based on the features extracted by the feature extractor 500. The result is a per-pixel classification as to whether the pixel represents a cloud or the Earth's surface ("ground"). There is no limit to the classification techniques that may be employed by the high-precision pixel classifier 501. However, as a few concrete examples, the high-precision pixel classifier 501 may employ techniques such as Naïve Bayes, Latent Dirichlet Allocation, Logistic Regression, Support Vector Machines ("SVMs"), Random Forest, Markov Random Field, and so forth. In some embodiments, the high-precision pixel classifier 501 is trained on a set of features which have been pre-labeled by manual or automatic means, which will be described in more detail below in Section 4.2.

In an embodiment, the noise remover 502 performs processing on the per-pixel classification produced by the high-precision pixel classifier 501 to reduce the number of false positives found within the classifications. For example, the noise remover 502 may remove cloud classifications from pixels which represent roads or urban areas, which are often mistaken for clouds due to sharing similar behavior with clouds for certain reflective bands. In an embodiment, the noise remover 502 applies morphological opening with two disk-shaped structuring elements with a radius of 20 m and 40 m respectively. Since many urban structures and roads are small and thin, morphological opening serves to smooth over those areas and effectively remove many of them from being classified as cloud pixels. As output, the noise remover 502 produces a cloud seed mask 511 which is fed as input to the cloud mask generator logic 172; the cloud seed mask may comprise a set of data or bit values that are digitally stored in electronic digital storage, such as main memory, coupled to or within the cloud detection subsystem 170.

2.5.3 Cloud Mask Generator Logic

In FIG. 5, the cloud mask generator logic 172 includes a high-recall pixel classifier 503, a second noise remover 504, urban detector 505, and pixel clusterer 506.

In an embodiment, the high-recall pixel classifier 503 represents logic for performing classification based on the features extracted by the feature extractor 500. The result is a per-pixel classification as to whether the pixel represents a cloud or the Earth's surface ("ground"). There is no limit to the classification techniques employed by the high-precision pixel classifier 501. However, as a few concrete examples, the high-precision pixel classifier 501 may employ techniques such as Naïve Bayes, Latent Dirichlet Allocation, Logistic Regression, Support Vector Machines, Random Forest, Markov Random Field, and so forth. In some embodiments, the high-recall pixel classifier 503 is trained on a set of features which have been pre-labeled by manual or automatic means, which will be described in more detail later in Section 4.2. As explained above, the high-recall pixel classifier 503 differs from the high-precision pixel classifier 501 in that the high-recall pixel classifier 503 has been configured to be less discerning when classifying a pixel as a cloud. The high-recall pixel classifier 503 may use the same machine learning approach as the high-precision pixel classifier 501 or may use a different approach. Similarly, the high-recall pixel classifier 503 may use the same features as input to the high-precision pixel classifier 501 or different features. In cases where the features are the same, the features generated by the feature extractor 500 may be reused for the high-recall pixel classifier 503. However, in cases where the features differ, the cloud mask generator logic 172 may include another feature extractor whose purpose it is to extract the features used by the high-recall pixel classifier 503 from the remote sensing imagery 510.

In an embodiment, the noise remover 504 performs processing on the per-pixel classification produced by the high-recall pixel classifier 503 to reduce the number of false positives found within the classifications. For example, the noise remover 504 may remove cloud classifications from pixels which represent roads or urban areas, which are often mistaken for clouds due to sharing similar behavior with clouds for certain reflective bands. In an embodiment, the noise remover 504 applies morphological opening with two disk-shaped morphological structuring elements with a radius of 20 m and 40 m respectively. Since many urban structures and roads are small and thin, morphological opening serves to smooth over those areas and effectively remove many of them from being classified as a cloud. However, denser urban areas may not be capable of being filtered by morphological opening and may remain erroneously marked as a cloud. In some embodiments, noise remover 502 is the same component as noise remover 504. For example, both may represent the same logic implemented by the same set of instructions or code that is invoked in both cases and fed the mask produced by the corresponding classifier. However, in other embodiments, noise remover 502 and noise remover 504 may function differentially, such as using differently shaped or sized structuring elements for the morphological opening.

In an embodiment, the urban detector 505 identifies pixels which correspond to urban areas and removes them from being classified as clouds. Some land covers have similar spectral signatures to clouds, such as bright urban areas. As a result, the classifications from the high-recall pixel classifier 503 may mistakenly consider these areas to be clouds. If such areas overlap with clouds, it is possible that the region growing methodology employed by the pixel clusterer 506 may grow the bright land pixels into the same cluster. One solution to this problem is to detect urban areas based a time series of image captures of the area. While the noise remover 504 may not be able to remove larger urban areas using morphological opening, urban areas tend to be fairly static whereas clouds are transient. Thus, in some embodiments, the urban detector 505 identifies urban areas by analyzing multiple historical images of the area and performing filtering for pixels with insufficient "whiteness" deviation throughout the time series. Those pixels can then be set to a ground classification. Alternatively, the urban detector 505 may produce an urban area mask that identifies which pixels represent urban areas within the image and supply the mask to the pixel clusterer 506 to avoid growing cloud seeds into those areas. Furthermore, although urban areas tend to contain many bright pixels, groups of these pixels are usually separated in space (by roads or grass) far more than bright pixels in clouds. Thus, in addition to or instead of the temporal images, the urban detector 505 may use distance between clusters of bright pixels and/or intervening pixels that may indicate grass or roads as a factor.

In an embodiment, the pixel clusterer 506 utilizes a region-growing clustering technique that expands the cloud seeds generated by the cloud seed generator logic 171 into the candidate cloud pixels generated by the high-recall pixel classifier 503 and processed by the noise remover 504 and urban detector 505. In an embodiment, the pixel clusterer 506, for each of the cloud seeds, marks the cloud seed and then marks any connected candidate cloud pixels. The process is then repeated for each of the marked candidate cloud pixels and continues repeatedly until no unmarked candidate cloud pixels are left. The marked pixels represent pixels which are considered clouds and a cloud mask 512 is generated that identifies cloud pixels for the remote sensing image. The cloud mask 512 may comprise a set of data or bit values that are digitally stored in electronic digital storage, such as main memory, coupled to or within the cloud detection subsystem 170. Since clouds tend to be clustered, the probability of a pixel being a cloud increases if connected to a neighbor who has been classified as a cloud. The pixel clusterer 506 uses this assumption to identify, based on the cloud seeds, which of the candidate cloud pixels are likely to be clouds. If a candidate cloud pixel is connected (directly or indirectly through other candidate cloud pixels) to a cloud seed, that candidate cloud pixel is classified as a cloud. Otherwise, if the candidate cloud pixel is disconnected from any of the cloud seeds, that candidate cloud pixel is likely to be a false positive and thus not marked as a cloud in the cloud mask 512.

2.5.3 Shadow Mask Generator Logic

In FIG. 5, the shadow mask generator logic 173 includes an optimal cloud height estimator 507 and shadow detector 508.

In an embodiment, the optimal cloud height estimator 507 estimates the most likely heights of the clouds indicated by the cloud mask 512, which is received as input, based on pixels within the remote sensing imagery 510 that are likely to be shadows. In most cases, dips in the NIR band are a useful metric for identifying shadows. Thus, in some embodiments, the optimal cloud height estimator 507 identifies candidate shadow pixels in the remote sensing imagery 510 by applying a thresholds, where if the NIR of the band is less than s, the pixel is marked as a candidate shadow pixel. The aforementioned technique generally contains a large number of false positives because many non-shadow areas also have low NIR values. However, the candidate cloud shadows can be used to estimate a height of the clouds in the cloud mask 512 based on geometry between the clouds, the satellite, and the light source (e.g. the Sun), the details of which will be explained in more detail in Section 8.0. The aforementioned geometry allows for the calculation of the shadow of a cloud based on factors such as cloud height and sun elevation angle, sun azimuth angle, and satellite off-nadir angle. The optimal cloud height estimator 507 uses the aforementioned geometry to iterate over potential heights and, during each iteration, determines how many candidate shadow pixels would be covered by the computed area. The height where the most candidate shadow pixels are covered is then considered the optimal height estimation for the cloud. The aforementioned process can be repeated for each cloud identified within the cloud mask 512.

In an embodiment, the shadow detector 508, then uses the estimated height to calculate which pixels correlate to shadows and marks those pixels as shadows within a shadow mask 513. For example, the shadow detector 508 can use the optimal estimated height, sun elevation angle, sun azimuth angle, and satellite off-nadir angle to compute the shadow distance from the cloud in north/south and east/west directions. The pixels that fall within the aforementioned area are then marked within the shadow mask 513. The cloud mask 512 and shadow mask 513 are provided as output, and may be digitally stored in electronic digital storage, such as main memory, coupled to or within the cloud detection subsystem 170.

2.6 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3.0 Example System Inputs

The exact inputs to the cloud detection subsystem 170 may vary across different implementations. In order to provide concrete examples, the following passages identify specific types of data that may be used by the cloud seed generator logic 171, cloud mask generator logic 172, and/or shadow mask generator logic 173 to detect clouds and/or cloud shadows within remote sensing imagery 510. However, the techniques described herein are not limited to any particular type of inputs or any particular location, services, or tools used to collect the inputs.

3.1 Remote Sensing Data

In this disclosure, "remote sensing data" or "remote sensing imagery" is treated as though synonymous with "satellite imagery." Thus, the examples provided herein use satellite imagery as the remote sensing data. However, the use of satellite imagery in the following examples does not limit the techniques described herein solely to remote sensing data that is satellite imagery. As technology develops other types of remote sensing technology may appear and the techniques described herein are broad enough to make use of any emerging remote sensing devices and/or techniques. For example, as an alternative to satellite imagery, the techniques described herein may also apply to images taken by aircraft or drones flying over an area, such as an agricultural field that is undergoing testing for ponding water, crop health, soil erosion, and so forth.

Many of the examples presented herein assume that the satellite imagery is capable of detecting various bands, such as the blue, green, red, red edge, and near infrared (NIR) bands at various resolutions. As a concrete example, the satellite imagery used as input to the model may be RapidEye satellite image data, which offers multispectral images at a spatial resolution of 5 m. As another example, Deimos satellite imagery may also be used as input to the techniques discussed herein. The main significant difference between Deimos and RapidEye imagery, besides spatial and temporal resolution, is the absence of blue and red-edge bands. As a result, embodiments which utilize Deimos satellite imagery may require slightly different processing than embodiments which utilize RapidEye imagery in order to compensate for the reduced feature set that is available. However, the techniques described herein are not limited to any particular type of satellite imagery and the features utilized by the techniques described herein can be adjusted to use the features available to a given type of satellite imagery.

The techniques described herein apply equally to situations where the satellite imagery can be captured on demand or captured periodically. For example, the user 102 and/or operator of the agricultural intelligence computer system 130 may contract with a separate company that owns the satellites used to take the images. Depending on the contract, the remote sensing imagery 510 used as input to the cloud detection subsystem 170 may be updated only on a periodic basis. As a result, in some cases, there may be a significant delay between image captures of the area being monitored by the satellite. Furthermore, depending on the number and positions of the satellites that are available, on demand images may not be possible until a satellite with appropriate positioning over the monitored area becomes available. However, in cases where the images can be taken on demand, the agricultural intelligence computer system 130 may be configured to communicate with a system of the satellite imagery provider and automatically request images in response to receiving user input via a device of the user 102, such as the field manager computing device 104, or before/upon beginning an analysis of the area.

In addition, the techniques described herein are not limited to using recent satellite images of the area under analysis as input. In some cases, there is an advantage to also analyzing historical images of the area. For example, to distinguish between clouds and man-made urban structures the urban detector 505 may analyze a time series of satellite images to determine if certain areas that have been classified as clouds remained static over time. Since clouds tend to be transient, "clouds" which have remained static over time are likely to represent permanent structures. Thus, in some embodiments, the model and field data repository 160 may include historical images of the area under analysis or the agricultural intelligence computer system 130 may be capable of retrieving such images from external data 110. Furthermore, in some embodiments, the features utilized by the high precision pixel classifier 501 and/or high recall pixel classifier 503 may be based on analyzing a time series of images, rather than only a static image of the area.

4.0 Classifier Overview

Many machine learning techniques, such as classifiers and certain types of regression, involve the estimation of a function that maps between a set of inputs (referred to as features) and a set of outputs (referred to as classes or labels). The estimation of the function, referred to as "training", is typically performed by analyzing a "training set" of features and their corresponding labels. By some definitions, a classifier outputs discrete labels whereas techniques based on regression produce continuous output values. However, for certain types of regression, such as logistic regression which produces a probability of being one of potentially two outcomes, this distinction is largely meaningless. For simplicity, the examples provided herein will refer to the machine learning technique used by the cloud detection subsystem 170 as classification regardless of the machine learning technique that is actually utilized. However, the aforementioned terminology is not intended to exclude any type of machine learning technique.

During the analysis, an optimization is performed to find the function that best explains the mapping between the features and the corresponding labels in the labeled training set. The terms "best", "maximum", and/or "optimum" as used herein do not necessarily refer to a global metric. In many cases a local maximum of the likelihood of the mapping between the features and the label given the function is sufficient. Different machine learning techniques perform the aforementioned optimizations in different ways. For example, naive Bayes classifiers assume independence of the features given the class and estimate a function that explains the association between the features and the label. As another example, artificial neural networks model the problem domain as systems of interconnected nodes (representing "neurons") which send messages to one another, often with some nodes representing the inputs, some nodes representing intermediary or "hidden" nodes, and some nodes representing the outputs. Thus, in such models, the estimation of the function involves determining the optimal weights between the edges connecting the nodes that are most likely to explain the mappings presented in the training set. Once a classifier is trained, a new data point of features can be fed into the classifier to obtain the predicted label for that data point. In most cases, classifiers output a set of potential labels and a confidence metric or other measure of the probability that the classification is correct. In most cases, the label to which the classifier assigned the highest confidence is considered the predicated label.

In the present problem domain the features for the high-precision pixel classifier 501 and the high-recall pixel classifier 503 include the various spectral bands recorded for each pixel of the remote sensing imagery 510 and the class is binary, potentially classifying each pixel as a cloud pixel or a ground pixel. The techniques described herein are not limited to any particular type of classifier. For example, the classifier utilized by the high-precision pixel classifier 501 and the high-recall pixel classifier 503 may utilize support vector machines (SVMs), neural networks, logistic regression, Bayesian techniques, perceptrons, decisions trees, and more without limitation. In order to provide clear examples, the remainder of this disclosure will assume the use of SVMs, which has shown accurate results in practice, but the techniques are not necessarily limited to embodiments where the high-precision pixel classifier 501 and the high-recall pixel classifier 503 each utilize a SVM.

4.1 Feature Selection

The exact features to utilize for the high-precision pixel classifier 501 and the high-recall pixel classifier 503 can be determined in many different ways. In some embodiments, the features are selected based on domain knowledge or selected by testing various combinations of features and choosing those which appear to produce the most accurate results. In other embodiments, the features may be selected automatically by defining an initial pool of potential features and performing cross-validation on different subsets to narrow down those features which appear to produce the most accurate results.

In addition, the exact features selected for consideration by the high-precision pixel classifier 501 and the high-recall pixel classifier 503 may be dependent on the type of remote sensing imagery 510 that is available. For example, Rapid-Eye imagery has a data set that includes the blue and red-edge bands and Deimos imagery (at least presently) does not. As a result, embodiments which utilize RapidEye imagery may use a different set of features than those used for Deimos imagery.

The exact features selected for consideration by the high-precision pixel classifier 501 and the high-recall pixel classifier 503 may be dependent on the types of classification techniques each classifier employs. For example, a classifier which utilizes logistic regression may perform better using a different set of features than a classifier which utilizes a SVM.

Furthermore, not all features are necessarily supplied directly from the remote sensing imagery 510. In some cases, features can be derived from the "raw" features supplied by the imagery by creating linear or non-linear combinations of different band values. The following are non-limited examples of such derived features. In the following examples, B is the blue band, G is the green band, R is the red band, RE is the red edge band, and NIR is the near infrared band.

NDVI—The normalized difference vegetation index, a function of NIR and R bands:

$$NDVI = \frac{NIR - R}{NIR + R}$$

NDW1—The normalized difference water index, a function of NIR and G bands:

$$NDWI = \frac{G - NIR}{G + NIR}$$

BRIGHT1—The mean Top of Atmosphere (TOA) reflectance of the visible bands:

$$BRIGHT1 = \frac{B + G + R}{3}$$

BRIGHT2—Similar to BRIGHT1, but using the G, R, and NIR bands:

$$BRIGHT2 = \frac{NIR + G + R}{3}$$

WHITENESS—The "flatness" of the spectrum based on BRIGHT1:

$$WHITENESS = \frac{\sum_{i \in \{b,g,r\}} |i - BRIGHT1|}{BRIGHT1}$$

HOT—A simplified formula of the haze-optimized transform:

$$HOT = B - 0.5 \times R$$

After significant testing, the B, G, R, and NIR bands were found to work well for embodiments where the classifiers utilize SVMs and the satellite imagery type was RapidEye. Furthermore, the "kernel trick" used by SVM classifiers has been found in practice to be able to map the aforementioned features into a high dimension domain where the two classes (e.g. cloud vs. ground) are relatively easy to separate. For embodiments which utilize Deimos imagery the B band was unavailable, but testing showed the remaining G, R, and NIR bands to produce fairly accurate results. Additional testing with RapidEye images over different types of classifiers revealed band threshold classifiers to perform optimally using B>0.16 as the threshold, LDA classifiers as performing optimally using B, G, and BRIGHT2 as the features, Logistic Regression classifiers as performing optimally using B, G, and BRIGHT2 as the features, and Random Forest classifiers as performing optimally using HOT, B, BRIGHT2, and G as the features.

In some embodiments, the features utilized as input to the high-precision pixel classifier 501 and the high-recall pixel classifier 503 may include features derived from a time series of images. For example, such features may include difference between the target scene's features and the historical per-pixel median, the ratio between the target scene's feature and the historical per-pixel median, the fraction of historical pixel values that fall below the target scene's feature, the number of standard deviations the target scene's feature is from the historical per-pixel mean, the maximum rate of range (feature value change divided by days transpired) between the target scene's feature and the preceding or following scene's feature value, and/or standard deviation of feature values for a single pixel location over time.

4.2 Preparing Ground Truth Data

As mentioned previously, the high-precision pixel classifier 501 and/or the high-recall pixel classifier 503 may require labeled "ground truth" data in order to train the classifier and develop the function that maps between pixel features and classifications.

One way to generate a labeled training set is to collect a sample of satellite images depicting areas with typical or a variety of cloud coverings. However, in some cases, images with no clouds could be included to provide negative examples for training the classifiers. The sample images can then be manually labeled by experts in the field to identify which pixels represent clouds and which pixels represent ground. Those labels can then be used as the "ground truth". In some embodiments, the aforementioned experts may add labels through use of a tool that allows free-form shapes to be drawn on the respective satellite images to mark the areas representing clouds. The pixels within the shapes are then marked in a training mask as clouds. In some embodiments, in addition to marking clouds, the training mask also identifies types of clouds (e.g. normal clouds, haze, etc.) and/or features related to clouds (such as cloud shadows). The exact manner of identifying pixels for use as the "ground truth" upon which to train the classifiers is not critical to the techniques described herein.

5.0 Analysis Triggers and Use Cases

As a whole, the cloud seed generator logic 171, cloud mask generator logic 172, shadow mask generator logic 173 together implement a coherent computer-executed process for identifying clouds within remote sensing imagery 510. However, identifying clouds within an image will often be used concurrently with other techniques that attempt to extract information by analyzing the remote sensing imagery 510. Thus, the cloud detection process may begin as an initial pre-processing stage to another entirely separate analysis. For example, "Ponding Water Detection on Satellite Imagery" by Guan et al., U.S. application Ser. No. 14/860,247, discusses techniques for identifying ponding water within satellite imagery, the entire contents of which is incorporated as though fully stated herein. However, presence of clouds or cloud shadows within the satellite images may interfere with the analysis since the bands observed from pixels containing clouds or cloud shadows may, in some cases, be mistaken for water. As a result, the technique used in the above referenced application may be modified to include a pre-processing or filtering step that removes, prevents a water classification, or smooths over pixels representing clouds or cloud shadows by using the cloud detection subsystem 170 to identify the problem areas. The techniques described herein are applicable to virtually any use case which analyzes satellite imagery that can potentially be affected by clouds or cloud shadows. Additional examples include automatically detecting crop health, soil erosion, soil nutrient analysis, crop growth analysis, drought detection, and so forth without limitation. Furthermore, the cloud mask 512 and shadow mask 513 generated by the cloud detection subsystem 170 may be used to visually display clouds and cloud shadows in an image, such as by applying each mask to transform the pixel color to one that is more visually distinguished (such as highlighting), providing a clear view of clouds or cloud shadow within the image in a user interface of the field manager computing device 104.

In some embodiments, the analysis performed by the cloud detection subsystem 170 is triggered via instructions sent from the field manager computing device 104 via the communication layer 132. For example, the field manager computing device 104 may be configured to display a user interface through which a variety of analyses or tests can be requested on particular geographical areas, such as an agricultural field of the user 102. Thus, the cloud detection subsystem 170 may be invoked by the agricultural intelligence computer system 130 as part of the pipeline executed to conduct the selected test or analysis.

6.0 Cloud Seed Generator

Figure 11:
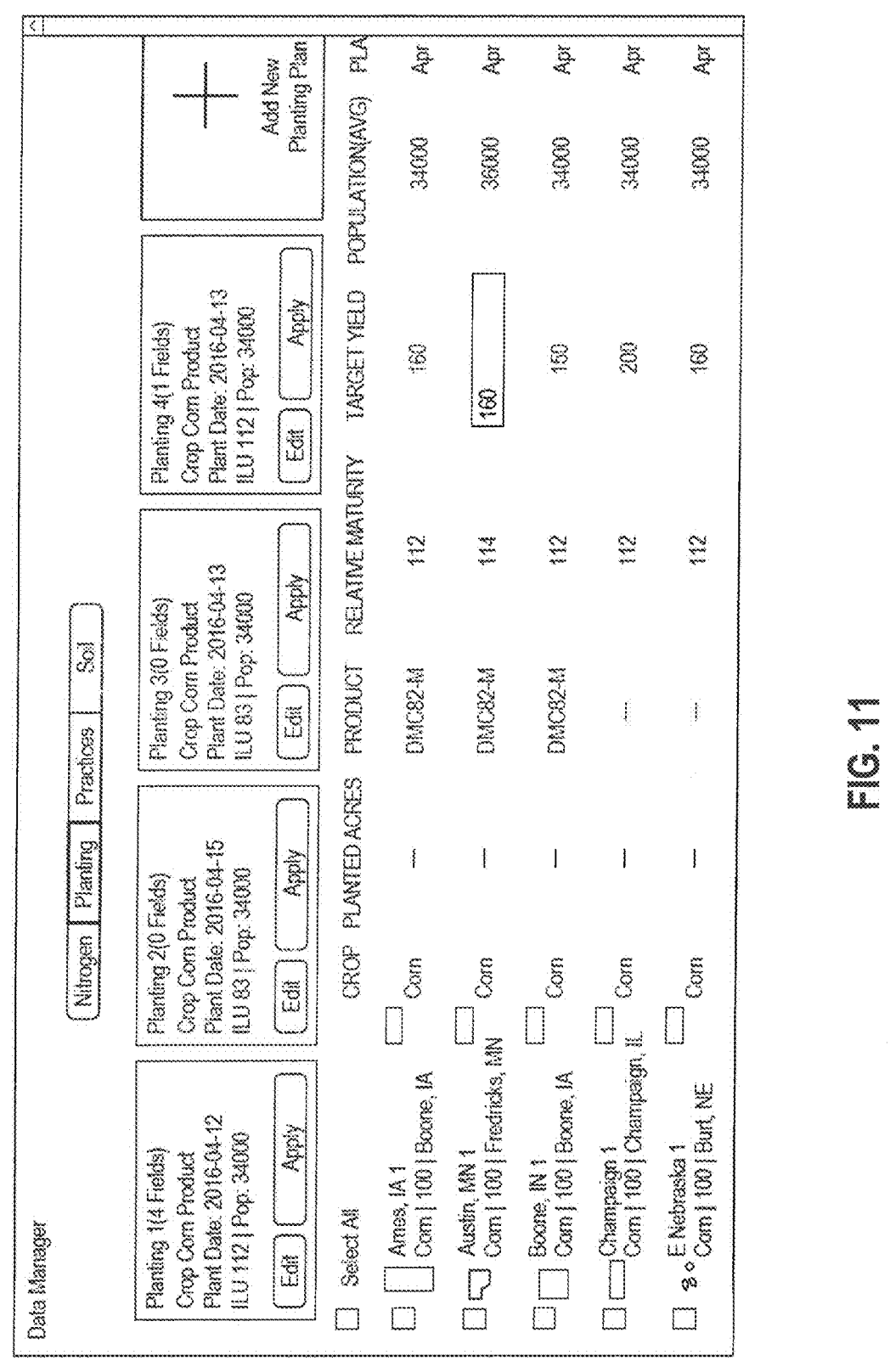

FIG. 11 illustrates an example process for generating a cloud seed mask 511 in block diagram form according to an embodiment. In the following explanation, the process depicted in FIG. 11 is assumed to be performed by components of the cloud detection subsystem 170, specifically the cloud seed generator logic 171. FIG. 11 illustrates specific blocks that have been laid out in a particular order. However, in other embodiments, blocks may be added, removed, divided out, merged, or rearranged compared to FIG. 11. The techniques described herein are not limited to the exact blocks in the exact order illustrated in FIG. 11.

In FIG. 11, at block 605, the feature extractor 500 receives remote sensing imagery 510 of an area. In some embodiments, the remote sensing imagery 510 is provided via the model data and field data repository 160 and/or external data 110. For example, the provider of the remote sensing imagery 510 may periodically send updated images to the model data and field data repository 160 or make the updated images available in the external data 110. Upon beginning the cloud detection analysis, the cloud detection subsystem 170 may retrieve the remote sensing imagery 510 from the model data and field data repository 160 and/or external data 110. In some embodiments, multiple images may be available in the model data and field data repository 160 of the area selected for analysis. In such cases, the field manager computing device 104 may be configured to receive selection of a particular image to analyze via a user interface displayed on the field manager computing device 104. Furthermore, if the provider of the remote sensing imagery 510 is capable of producing images of the area on demand, the cloud detection subsystem 170 may send a request to a server system of the image provider, receive the image, and then pass the result to the feature extractor 500. However, the exact mechanism used to obtain the remote sensing imagery 510 of the area is not critical to the techniques described herein.

At block 610, the feature extractor 500 extracts one or more features from the remote sensing imagery 510. As discussed above in Section 5.1, the features extracted from the remote sensing imagery 510 may vary depending on the machine learning technique used to implement the high-precision pixel classifier 501 and the type of the remote sensing imagery 510. In addition, the features extracted may be basic or raw features that are extracted directly from the image or may be linear or non-linear combinations of features extracted from the image. Furthermore, in some embodiments, the information contained within the remote sensing imagery 510 may be supplemented with additional features derived from an outside source, such as time of day the image was taken, temperature, date, geographical coordinates, and so forth provided by the field data repository 160 and/or external data 110.

At block 615, the high-precision pixel classifier 501 is trained on labeled training data. The training of the high-precision pixel classifier 501 will differ depending on the machine learning technique used to implement the high-precision pixel classifier 501. However, there are many commercially available tools, such as Vowpal Wabbit, Spark, PyBrain, and so forth that implement a variety of machine learning techniques that could potentially be used to implement the high-precision pixel classifier 501. In some embodiments, the high-precision pixel classifier 501 includes a component that processes the labeled training data into a format expected by the utilized library, and then invokes a training routine of the library to train the machine learning model. However, although there are many well-known machine learning techniques that may be used to implement the high-precision pixel classifier 501, many classifiers have configurable settings or coefficients that may need to be adjusted to provide adequate results. For example, in the case of a SVM, the per-class penalty may be set to 5:1 and the kernel function may be set to Radial Basis Function (RBF) with ($\gamma$=0.25 and C=1.0).

In some embodiments, the high-precision pixel classifier 501 may be trained ahead of time based on the labeled training data with the resultant function stored for later use within the model data and field data repository 160. In such cases, provided that the high-precision pixel classifier 501 has already been trained, block 615 may be skipped. Instead, block 615 may be replaced with the function being retrieved from the model data and field data repository 160.

At block 620, the high-precision pixel classifier 501 is used to identify cloud seeds based on the extracted features in a cloud seed mask 511. In an embodiment, the high-precision pixel classifier 501 uses the features extracted at block 610 as input to the function developed at block 615 to produce a classification for each pixel in the remote sensing imagery 510. However, in other embodiments, the high-precision pixel classifier 501 may only perform classification on a subset of pixels within the remote sensing imagery 510. For example, there may be areas of the picture that are considered unimportant or otherwise may be excluded from analysis and have been recorded in an exclusion mask. Thus, when the pixel is marked for exclusion in the exclusion mask, the high-precision pixel classifier 501 skips the classification of the features of the associated pixel. In some embodiments, if utilizing an existing machine learning library, the features extracted at block 610 may be reformatted to fit a format expected by the machine learning library utilized. After block 620 has been performed, the cloud seed mask 511 is generated that identifies which pixels within the remote sensing imagery 510 are considered by the high-precision pixel classifier 501 to be clouds.

At block 625, the noise remover 502 performs image processing on the cloud seed mask 511 to smooth over false positives. In an embodiment, the noise remover 502 performs one or more morphological opening operations on the cloud seed mask 511. In mathematical morphology, an opening is an erosion followed by a dilation using the same structuring element held at the same orientation. In this case, the "foregoing" pixels are the pixels marked in the mask as clouds and the "background" pixels are those marked in the mask as ground. For example, for RapidEye images, two morphological openings may be performed using a disk shaped structural element of sizes 20 m and 40 m. However, the shape and size of the structuring element may change depending on the resolution of the remote sensing imagery 510. In effect, the morphological opening operations smooth out the areas within the images designated as "clouds" and will typically remove false positives as a result of anomalous ground features, such as urban structures. Once the noise remover 502 has applied the morphological opening(s) to the cloud seed mask 511, the cloud seed mask 511 is used as input to the cloud mask generator logic 172.

7.0 Cloud Mask Generator

Figure 7:
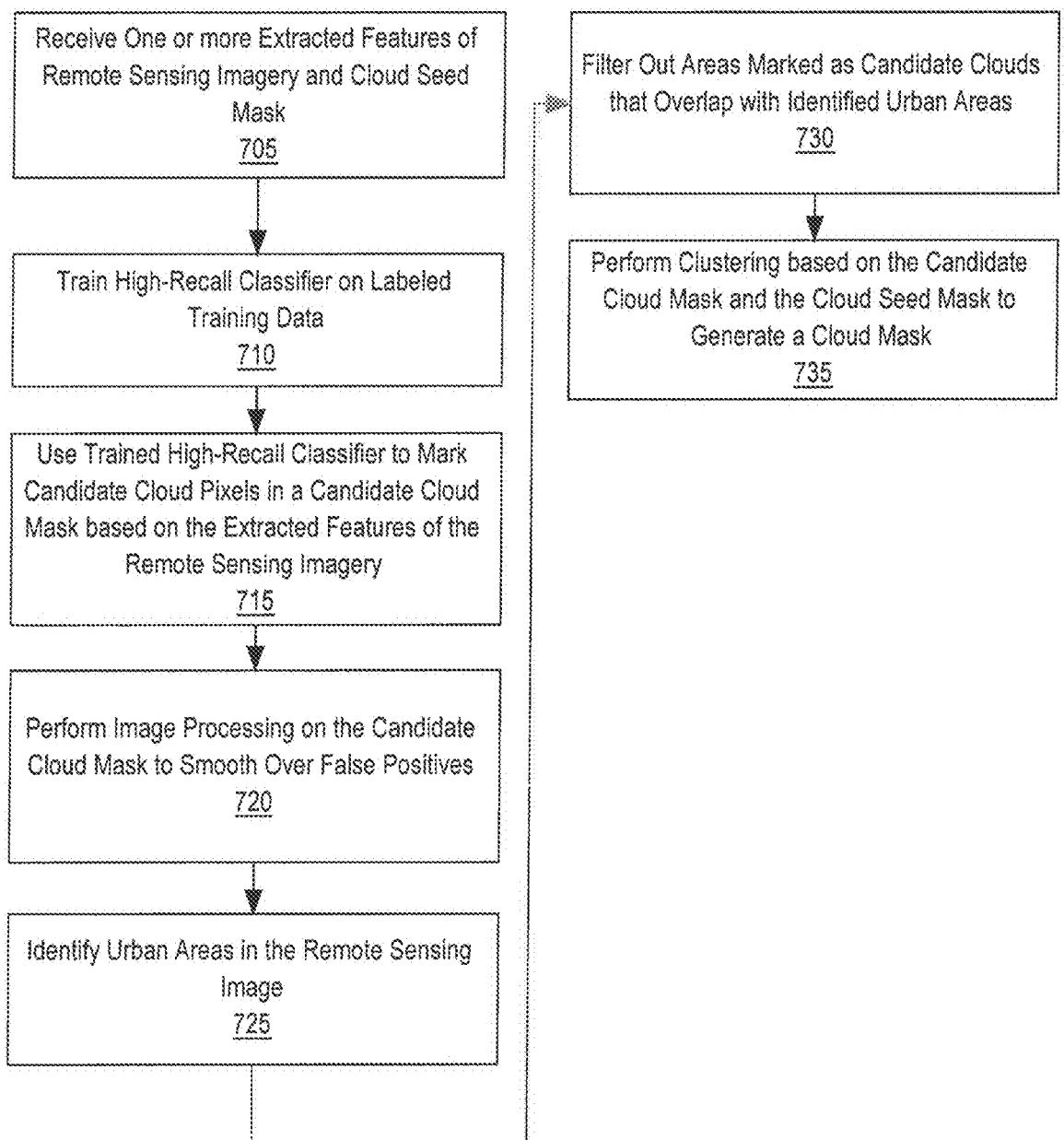
FIG. 7 illustrates an example process for generating a cloud mask for remote sensing imagery according to an embodiment.

FIG. 7 illustrates a process generating a cloud mask 512 in block diagram form according to an embodiment. In the following explanation, the process depicted in FIG. 7 is assumed to be performed by components of the cloud detection subsystem 170, specifically the cloud mask generator logic 172. FIG. 7 illustrates specific blocks that have been laid out in a particular order. However, in other embodiments, blocks may be added, removed, divided out, merged, or rearranged compared to FIG. 7. The techniques described herein are not limited to the exact blocks in the exact order illustrated in FIG. 7.

In FIG. 7, at block 705, the high-recall pixel classifier 503 receives one or more extracted features of the remote sensing imagery 510. Depending on the embodiment, the cloud seed mask 511 may be retrieved by the logic contained within the high-recall pixel classifier 503 or another component contained within the cloud mask generator logic 172. For example, the high-recall pixel classifier 503 may receive the cloud seed mask 511 to feed into other components of the cloud mask generator logic 172, even though the high-recall pixel classifier 503 itself does not necessary use the mask during its analysis. Alternatively, the high-recall pixel classifier 503 may instead receive only the features of the remote sensing imagery 510 and rely on a different component of the cloud mask generator logic 172 to retrieve the cloud seed mask 511, such as the pixel clusterer 506. The remainder of the discussion of Section 7.0 assumes the high-recall pixel classifier 503 receives the cloud seed mask 511, but as discussed above, the cloud seed mask 511 could be received by a different component of the cloud mask generator logic 172 in other embodiments. In an embodiment, the high-recall pixel classifier 503 receives the one or more extracted features of the remote sensing imagery and the cloud seed mask 511 from the cloud seed generator logic 171. However, in other embodiments, instead of receiving the features directly from the cloud seed generator logic 171, the cloud mask generator logic 172 may receive the remote sensing imagery 510 and include a feature extractor component that extracts features from the remote sensing imagery 510 for use in the high-recall pixel classifier 503. For example, if the high-recall pixel classifier 503 uses a different set of features than the high-precision pixel classifier 501, the features extracted by the feature extractor 500 of the cloud seed generator logic 171 may not be compatible. In an embodiment, the cloud seed mask 511 is a mask that identifies cloud seed pixels within the remote sensing imagery 510 and has been produced by the cloud seed generator logic 171 as described above in Section 6.0.

At block 715, the high-recall pixel classifier 503 is trained on labeled training data. The training of the high-recall pixel classifier 503 will differ depending on the machine learning technique used to implement the high-recall pixel classifier 503. However, there are many commercially available tools, such as Vowpal Wabbit, Spark, PyBrain, and so forth that implement a variety of machine learning techniques that can be used by the high-recall pixel classifier 503. Thus, the high-recall pixel classifier 503 may be implemented by including a component that processes the labeled training data into a format expected by the utilized library, and then invokes a training routine of the library to train the machine learning model. However, although there are many well-known machine learning techniques that may be used to implement the high-precision pixel classifier 501, many classifiers have configurable settings or coefficients that may need to be adjusted to provide adequate results. For example, in the case of a SVM, the per-class penalty may be set to 1:5 and the kernel function may be set to Radial Basis Function (RBF) with ($\gamma$=0.25 and C=1.0).

In some embodiments, the high-recall pixel classifier 503 may be trained ahead of time based on the labeled training data and the resultant function stored for later use in the model data and field data repository 160. In such cases, provided the high-recall pixel classifier 503 has already been trained, block 715 may be skipped. Instead, block 715 may be replaced with the function being retrieved from the model data and field data repository 160.

At block 720, the high-recall pixel classifier 503 marks candidate cloud pixels in a candidate cloud mask based on the extracted features of the remote sensing imagery 510. In an embodiment, the high-recall pixel classifier 503 uses the extracted features as input to the function developed at block 715 to produce a classification for each pixel in the remote sensing imagery 510 as to whether that pixel is a candidate cloud pixel. The identified candidate cloud pixels are then marked in the candidate cloud mask. However, in other embodiments, the high-recall pixel classifier 503 may only perform classification on a subset of pixels within the remote sensing imagery 510. For example, there may be areas of the image that are considered unimportant or otherwise may be excluded from analysis and recorded in an exclusion mask. Thus, when the pixel is marked for exclusion in the exclusion mask, the high-recall pixel classifier 503 skips the classification of the features for the associated pixel. In some embodiments, if utilizing an existing machine learning library, the extracted features may be reformatted to fit a format expected by the machine learning library being utilized.

At block 725, the noise remover 504 performs image processing on the candidate cloud mask to smooth over false positives. In an embodiment, the noise remover 504 performs one or more morphological opening operations on the candidate cloud mask. In mathematical morphology, an opening is an erosion followed by a dilation using the same structuring element held at the same orientation. For example, for RapidEye images, two morphological openings may be performed using a disk shaped structural element of sizes 20 m and 40 m. However, the shape and size of the structuring element may change depending on the resolution of the remote sensing imagery 510. In effect, the morphological opening operations smooth out the areas within the images designated as "candidate clouds" and will typically remove false positives as a result of anomalous ground features, such as urban structures. In some embodiments, the noise remover 504 is functionally equivalent to noise remover 502. For example, both may be implemented using the same set of code or instructions. However, in other embodiments, noise remover 504 may be functionally different from noise remover 502, such as using a differently shaped or differently sized structuring element.

At block 730, the urban detector 505 identifies urban areas in the remote sensing imagery 510. In some embodiments, the urban detector 505 receives as additional input one or more historical images of the area being analyzed from the model data and field data repository 160. The urban detector 505 can identify urban areas based on a heuristic, such as threshold values based on various bands or metrics derived from the remote sensing imagery 510. For instance, a pixel may be considered urban if ($\sigma_{WHITENESS}$<0.2)$\wedge$(NDWI<0.2), where $\sigma_{WHITENESS}$ represents the standard deviation of WHITENESS over the time series of imagery. The first part of the expression captures urban areas' stable characteristics across images taken on different dates. The second part expressly excludes water, which is also stable over time, from being classified as urban.

At block 735, the urban detector filters out areas marked as candidate clouds in the candidate cloud mask that overlaps with the identified urban areas. In an embodiment, pixels which have been identified at block 730 as representing urban structures are marked in the candidate cloud mask as not being a candidate cloud. Thus, pixels which have been classified as candidate clouds, but in fact represent urban areas emitting many of the same band characteristics as clouds, can be removed from the candidate cloud mask to improve accuracy.

At block 740, the pixel clusterer 506 performs clustering based on the candidate cloud mask and cloud seed mask 511 to generate cloud mask 512. In an embodiment, the pixel clusterer 506 performs clustering using a region growing technique. The region growing technique uses the pixels identified as cloud seeds in the cloud seed mask 511 as starting points and marks any candidate cloud pixel that touches a cloud seed (directly or indirectly through other candidate cloud pixels) as clouds within the cloud mask 512. Additional details regarding the region growing technique is provided below in Section 7.1.

7.1 Region Growing

Figure 8:
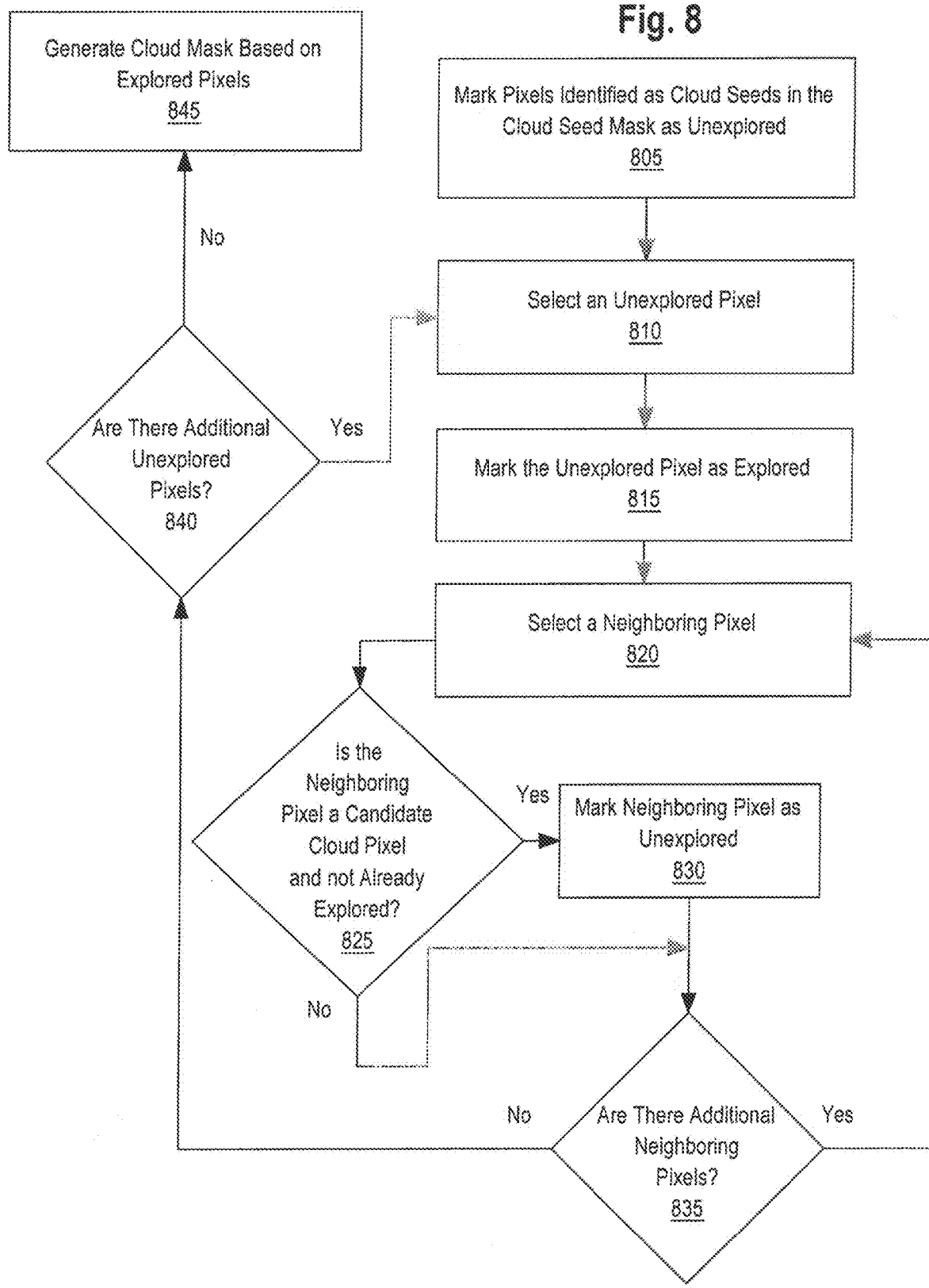
FIG. 8 illustrates an example process for clustering cloud pixels derived from remote sensing imagery according to an embodiment.

FIG. 8 is a block diagram that illustrates using region growing to generate a cloud mask 512 according to an embodiment. In the following explanation, the process depicted in FIG. 8 is assumed to be performed by the pixel clusterer 506. FIG. 8 illustrates specific blocks that have been laid out in a particular order. However, in other embodiments, blocks may be added, removed, divided out, merged, or rearranged compared to FIG. 8. The techniques described herein are not limited to the exact blocks in the exact order illustrated in FIG. 8.

In FIG. 8, at block 805, the pixel clusterer 506 marks pixels identified as cloud seeds in the cloud seed mask 511 as unexplored. The data structure used to perform the marking is not critical. For example, the markings could be made in a matrix where each entry corresponds to a pixel in the remote sensing imagery 510 or any other suitable data structure. In an embodiment, the pixel clusterer 506 marks the pixel by storing a value corresponding to the "unexplored" state, such as a number, letter, or any other value. In an embodiment, the values within the data structure correspond to "not considered", "unexplored", and "explored". In such embodiments, the "not considered" state represents that the pixel has not yet been analyzed or has been analyzed and is not considered to be a cloud pixel. For example, the "not yet considered" state may represent the initial state of all pixels except for those pixels which correlate to the cloud seeds specified by the cloud seed mask 511. The "unexplored" state indicates that the pixel is considered a cloud, but that the neighbors of that pixel have not yet been explored. Additionally, the "unexplored" state may be considered the initial default state of pixels corresponding to cloud seeds. The "explored" state indicates that the pixel is considered a cloud and the neighboring pixels are either currently being analyzed to determine whether those pixels represent clouds or the neighboring pixels have already been considered. In general, the process illustrated by FIG. 8 selects an unexplored pixel, marks the unexplored pixel as explored, and then determines whether the neighbors of the selected pixels are cloud pixels. If so, the neighbor is marked as unexplored if not already explored. The aforementioned process then repeats until no unexplored pixels are left. Thus, at the end of the process illustrated in FIG. 8, all unexplored pixels will eventually be marked as explored, which marks the end of the process. At that point, the explored pixels are marked as clouds within the cloud mask 512.

At block 810, the pixel clusterer 506 selects an unexplored pixel. The criteria used to select the unexplored pixel is not critical. For example, the unexplored pixels may be maintained in a list or any other suitable data structure and selected in the order in which the unexplored pixels appear. As another example, the unexplored pixels may be chosen at random.

At block 815, the pixel clusterer 506 marks the unexplored pixel as explored.

At block 820, the pixel clusterer 506 selects an unexplored neighboring pixel.

At block 825, the pixel clusterer 506 determines whether the selected neighboring pixel is a candidate cloud pixel as defined by the candidate cloud mask and is not already marked as explored. If so, the pixel clusterer 506 marks the neighboring pixel as unexplored at block 830.

At block 835, the pixel clusterer 506 determines whether there are any additional neighboring pixels. For example, the pixel clusterer 506 may determine if there are any neighboring pixels of the pixel selected at block 810 which have yet to be considered. If so, the pixel clusterer 506 returns to block 820 to select another neighboring pixel. Otherwise, the pixel clusterer 506 proceeds to block 840.

At block 840, the pixel clusterer 506 determines whether there are any additional unexplored pixels. If so, the pixel clusterer returns to block 810 to select another unexplored pixel. If not, the pixel clusterer 506 proceeds to block 845.

At block 845, the pixel clusterer 506 generates the cloud mask 512 by marking any pixel marked as "explored" as clouds within the cloud mask 512.

8.0 Shadow Mask Generator

Figure 9:
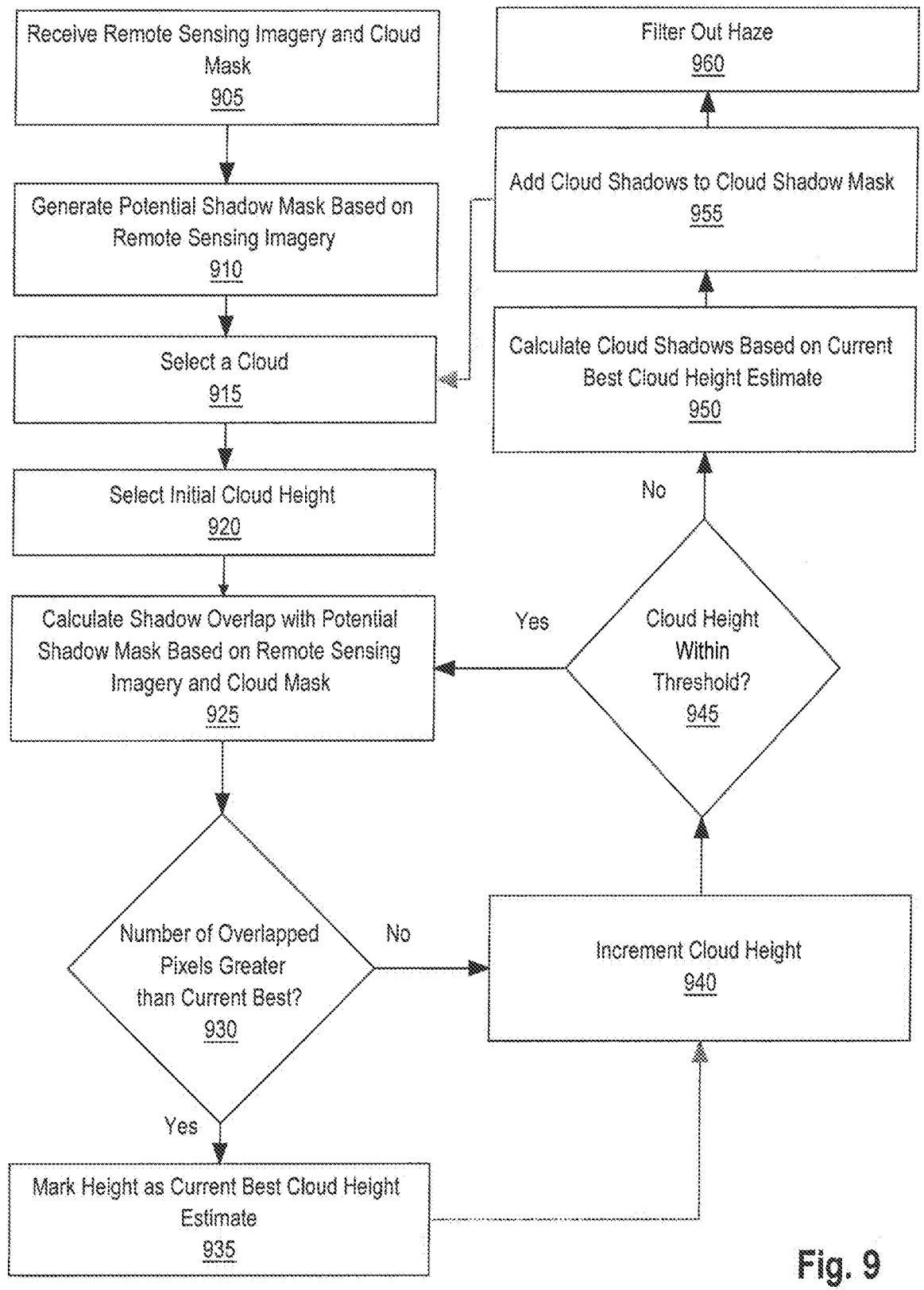
FIG. 9 illustrates an example process for generating a shadow mask for remote sensing imagery according to an embodiment.

FIG. 9 illustrates a process for generating a shadow mask 513 in block diagram form according to an embodiment. In the following explanation, the process depicted in FIG. 9 is assumed to be performed by the shadow mask generator logic 173. FIG. 9 illustrates specific blocks that have been laid out in a particular order. However, in other embodiments, blocks may be added, removed, divided out, merged, or rearranged compared to FIG. 9. The techniques described herein are not limited to the exact blocks in the exact order illustrated in FIG. 9.

In FIG. 9, at block 905, the cloud height estimator 507 receives remote sensing imagery 510 and cloud mask 512. In some embodiments, the cloud height estimator 507 receives the remote sensing imagery 510 and the cloud mask 512 from the cloud mask generator logic 172. For example, after the cloud mask generator logic 172 has completed generating the cloud mask, the cloud mask generator logic 172 may invoke the shadow mask generator logic 173 to begin the process of generating a shadow mask 513 for the remote sensing imagery 510.

At block 910, the cloud height estimator 507 generates a potential shadow mask based on the remote sensing imagery 510. In an embodiment, the cloud height estimator 507 generates the potential shadow mask by using a threshold for the NIR band for each pixel in the remote sensing imagery 510. Thus, if NIR<s for the pixel, where s is a threshold value, that pixel is marked in the potential shadow mask as a potential shadow.

At block 915, the cloud height estimator 507 selects a cloud from the cloud mask 512. In an embodiment, as a result of applying the pixel clusterer 506, clouds within the cloud mask 512 have been "grouped" into distinct clouds. In some embodiments, the pixel clusterer 506 may include metadata for each cloud pixel marking which "group" or cloud to which the pixel belongs. However, in other embodiments, the cloud height estimator 507 may determine the distinct clouds by compiling groups of cloud pixels within the cloud mask 512 that are connected (directly or indirectly through other cloud pixels). Once the various clouds within the cloud mask 512 have been identified, the cloud height estimator 507 selects a cloud to determine the shadow cast by that cloud. The selection order is not critical and may occur in virtually any order.

At block 915, the cloud height estimator 507 selects an initial height for the cloud. In an embodiment, the cloud height estimator 507 determines the likely height of a cloud by experimenting with different heights and selecting the height that causes the predicted shadow of the cloud to cover the greatest number of potential shadow pixels in the potential shadow mask. Thus, in one embodiment, the initial height may be set to a value that is a lower threshold of cloud heights, assuming the cloud height estimator 507 increments the height at block 940. For example, typical cloud heights generally fall within 200 m-12,000 m. Thus, the initial starting height may be set to 200 m. However, other embodiments may start at an upper threshold of cloud heights and decrement the height at block 940. In such cases, the cloud height estimator 507 may set the initial cloud height to 2000 m. Furthermore, the exact range over which the aforementioned process iterates the heights is not critical and can work for any range of heights that an embodiment chooses to iterate over.

At block 920, the cloud height estimator 507 calculates shadow overlap with the potential shadow mask based on the remote sensing imagery 510 and the cloud mask 512. In an embodiment, the location of a shadow relative to the cloud is given by the following series of equations $$L_s = \frac{H_c}{\tan(\alpha_c)}$$

$$L_s^{shift} = H_c \tan(\alpha_n)$$

$$L_s^{north} = H_c \cos(\alpha_a)$$

$$L_s^{west} = L_s \sin(\alpha_a) + L_s^{shift}$$

Where $H_c$ is the cloud height, $L_s$ is the shadow horizontal distance from the cloud, $L_s^{shift}$ is the cloud shift, $L_s^{west}$ is the shadow distance from the cloud in east/west, $L_s^{north}$ is the shadow distance from the cloud in north/south, $\alpha_e$ is the sun angle elevation, $\alpha_a$ is the sun azimuth angle, and $\alpha_n$ is the satellite off-nadir angle. The elevation angle, sun azimuth angle and satellite off-nadir angle are often provided by the provider of the remote sensing imagery 510 and may be included as metadata stored within or association with the remote sensing imagery 510. The above equations may be calculated for each pixel within the selected cloud, providing the bounds of the shadow cast by that pixel. The sum of the shadows cast by each pixel of the cloud thus represents the area of shadow predicted to be cast by the cloud. The cloud height estimator 507 then counts the number of pixels in the predicted shadow that overlap with pixels marked as potential shadows within the potential shadow mask generated at block 910.

At block 925, the cloud height estimator 507 determines whether the number of overlapped pixels is greater than the current best height estimate. If so, the cloud height estimator 507 marks the current height as the current best cloud height estimate at block 930.

At block 935, the cloud height estimator 507 increments the cloud height. In an embodiment, the cloud height estimator 507 increments the cloud height by a set amount during each iteration. Setting the increment finely increases the likelihood that the final estimated cloud height is accurate, but also causes the algorithm to perform more iterations. In addition, setting the increment coarsely may decrease the likelihood that the final estimated cloud height is accurate, but also reduces the number of iterations performed, thus speeding up the calculation of the shadow mask 513. In other embodiments, rather than incrementing the cloud height at block 935, the cloud height estimator 507 may start with an initial cloud height set to an upper threshold and instead decrement the height at block 935. Furthermore, there is no requirement that the search of the solution space for the height be performed in a linear fashion. Other technique may also be used to guide the search through the cloud height solution space, such as by applying gradient descent or Bayesian based search techniques. However, since in most cases the number of iterations will be relatively small, a simple grid search through the solution space will generally be sufficient for most use cases. In an embodiment, the height is incremented by 20 m after each iteration.

At block 940, the cloud height estimator 507 determines whether the cloud height is within a threshold height. In embodiments where the height is originally set to a lower threshold and then incremented, the threshold height at block 940 represents the upper threshold. Similarly, in embodiments where the height is originally set to an upper threshold and then decremented, the threshold height at block 940 represents the lower threshold. Thus, block 940 causes the search through the space of potential heights to be bounded to a particular range and signals when that search has been completed.

At block 945, the shadow detector 508 calculates the shadows of the cloud based on the current best cloud height estimate. In an embodiment, the shadow detector 508 performs the same calculations as at block 925 with the current best cloud height estimate. However, in some embodiments, the cloud height estimator 507 may store or keep track of the predicted shadow area for the current best estimate, thus obviating the need to recalculate the area at block 945. Thus, in such embodiments, block 945 may be skipped or replaced with a step of retrieving the shadow area of the current best cloud height estimate.

At block 950, the shadow detector 508 adds the calculated shadows to the shadow mask 513. In an embodiment, the pixels of the remote sensing imagery 510 that fall within the estimated shadow of the cloud are marked in the shadow mask 513 as shadows. After, if any clouds are left that have yet to have their shadows calculated and added to the shadow mask 513, a new cloud is selected at block 915. Otherwise, the shadow mask 513 is complete and accurately identifies the shadows cast by the clouds within the remote sensing imagery 510.

The above explanation of FIG. 9 assumes that various metrics related to the relative position of the satellite and the sun are known or can be extracted from metadata associated with the remote sensing imagery 510. However, in some cases the provider of the imagery may only have a subset of the metrics available. For example, in Deimos imagery the off-nadir angle is very close to zero. As a result, the direction of projected shadow pixels does not line up with the direction of the respective cloud pixel correctly and the sun azimuth angles provided tend to be inaccurate. To resolve this issue, in addition to iterating over potential heights, an alternative embodiment may also iterate over sun azimuth angles, effectively performing a grid search over $H_c$ and $\alpha_a$. The range of heights to iterate over and the amount of increment at each iteration may remain the same as described above. The range of azimuth angles to iterate over may be based on the provided azimuth angle, such as +/−24 degrees and may be incremented at each iteration by 4 degrees. If any additional metrics are missing, the same technique can be expanded to perform a grid search over the missing metrics.

9.0 Haze Detection

In some embodiments, the cloud detection subsystem 170 also includes a component that detects pixels corresponding to haze in a haze mask. For example, the cloud detection subsystem 170 may perform a tasseled cap transformation, where the first three components, named BRIGHTNESS, GREENNESS, and YELLOWNESS are calculated via the following equation:

$$T_i = C_B*B + C_G*G + C_R*R + C_{RE}*RE + C_{NIR}*NIR$$

Where i represents the tasseled cap component name and C is the transformation coefficient for each respective band. In an embodiment, haze is detected by thresholding on the YELLOWNESS component.

10.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

11.0 Additional Disclosure

Aspects of the subject matter described herein are set out in the following numbered clauses:

1. A method comprising: receiving remote sensing imagery of a geographical area, wherein the remote sensing imagery includes a plurality of pixels and one or more band values for each pixel within the remote sensing imagery; using a first classifier, identifying one or more cloud seed pixels from the remote sensing imagery based on the one or more band values for each pixel; using a second classifier, identifying one or more candidate cloud pixels from the remote sensing imagery based on the one or more band values for each pixel, wherein the first classifier favors precision compared to the second classifier and the second classifier favors recall compared to the first classifier; identifying a set of the one or more candidate cloud pixels that are connected to the one or more cloud seed pixels by one or more of: being a member of the one or more cloud seed pixels, being directly connected to at least one of the one or more cloud seed pixels, or being indirectly connected to at least one of the one or more cloud seed pixels through at least one candidate cloud pixel of the one or more candidate cloud pixels; generating a cloud mask for the remote sensing imagery based on the set, wherein the cloud mask identifies which pixels within the remote sensing imagery correspond to clouds.

2. The method of Clause 1, wherein the remote sensing imagery is one or more of: RapidEye satellite imagery or Deimos satellite imagery.

3. The method of any of Clauses 1-2, further comprising displaying the remote sensing imagery with one or more clouds highlighted based the cloud mask.

4. The method of any of Clauses 1-3, further comprising: identifying one or more clouds within the remote sensing imagery based on the cloud mask; identifying one or more potential shadow pixels within the remote sensing imagery based on the one or more band values for each pixel within the remote sensing imagery; for each cloud of the one or more clouds, determining an optimal height of the cloud based on a geometric relationship between a satellite which captured the remote sensing imagery and a sun based on the one or more potential shadow pixels; for each cloud of the one or more clouds, identifying one or more shadow pixels within the remote sensing imagery representing a shadow cast by the cloud based on the optimal height of the cloud; generating a shadow mask that identifies shadows cast by the one or more clouds within the remote sensing imagery based on the one or more shadow pixels identified for each cloud of the one or more clouds.

5. The method of Clause 4, wherein for each cloud of the one or more clouds, determining the optimal height of the cloud based on the geometric relationship comprises iterating over height values and, during each iteration, using the geometric relationship to calculate an estimated shadow area of the cloud and counting a number of the one or more potential shadow pixels that fall within the estimated shadow area, wherein the optimal height of the cloud is a height which maximizes the one or more potential shadow pixels that fall within the estimated shadow area.

6. The method of any of Clauses 4-5, wherein the geometric relationship is based on one or more of: sun elevation angle, sun azimuth angle, or satellite off-nadir angle.

7. The method of any of Clauses 1-6, wherein the one or more cloud seed pixels are represented in a cloud seed mask and further comprising applying one or more morphological opening operations to the cloud seed mask.

8. The method of any of Clauses 1-7, wherein the one or more candidate cloud pixels are represented in a candidate cloud mask and further comprising applying one or more morphological opening operations to the candidate cloud mask.

9. The method of any of Clauses 1-8, further comprising identifying urban areas within the remote sensing imagery based on deviations in whiteness for each pixel across a time series of images of the geographical area and removing pixels corresponding to the identified urban areas from the one or more candidate cloud pixels.

10. The method of any of Clauses 1-9, further comprising: identifying one or more clouds within the remote sensing imagery based on the cloud mask; identifying one or more potential shadow pixels within the remote sensing imagery based on the one or more band values for each pixel within the remote sensing imagery; for each cloud of the one or more clouds, determining an optimal height of the cloud and an optimal sun azimuth angle based on a geometric relationship between a satellite which captured the remote sensing imagery and a sun based on the one or more potential shadow pixels; for each cloud of the one or more clouds, identifying one or more shadow pixels within the remote sensing imagery representing a shadow cast by the cloud based on the optimal height of the cloud and the optimal sun azimuth angle; generating a shadow mask that identifies shadows cast by the one or more clouds within the remote sensing imagery based on the one or more shadow pixels identified for each cloud of the one or more clouds.

11. The method of any of Clauses 1-10, wherein the one or more bands values includes a value for each of one or more of: a red band, a blue band, a green band, a red edge band, or a near infra-red band.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

What is claimed is:

1. A method comprising:
   receiving remote sensing imagery of a geographical area;
   identifying one or more clouds within the remote sensing imagery;
   identifying one or more potential shadow pixels within the remote sensing imagery;
   for each cloud of the one or more clouds:
      determining an optimal height of the cloud based on a geometric relationship between a satellite which captured the remote sensing imagery and a sun and based on the one or more potential shadow pixels determined by calculating an estimated shadow area of the cloud and counting a number of one or more potential shadow pixels that fall within the estimated shadow area; and
      generating, based on the optimal height, a shadow mask that identifies shadows cast by the one or more clouds within the remote sensing imagery based on the one or more potential shadow pixels identified for each cloud of the one or more clouds.

2. The method of claim 1, wherein the remote sensing imagery is one or more of: RapidEye satellite imagery or Deimos satellite imagery.

3. The method of claim 1, further comprising displaying the remote sensing imagery with the one or more clouds highlighted based a cloud mask.

4. The method of claim 3, wherein the cloud mask is generated by:
   using a first classifier, identifying one or more cloud seed pixels from the remote sensing imagery based on one or more band values for each pixel;
   using a second classifier, identifying one or more candidate cloud pixels from the remote sensing imagery based on the one or more band values for each pixel;
   wherein the first classifier favors precision compared to the second classifier and the second classifier favors recall compared to the first classifier;
   identifying a set of the one or more candidate cloud pixels that are connected to the one or more cloud seed pixels by one or more of: being a member of the one or more cloud seed pixels, being directly connected to at least one of the one or more cloud seed pixels, or being indirectly connected to at least one of the one or more cloud seed pixels through at least one candidate cloud pixel of the one or more candidate cloud pixels; and
   generating the cloud mask for the remote sensing imagery based on the set.

5. The method of claim 4, wherein the optimal height of a cloud is a height which maximizes the one or more potential shadow pixels that fall within the estimated shadow area.

6. The method of claim 4, wherein the geometric relationship is based on one or more of: sun elevation angle, sun azimuth angle, or satellite off-nadir angle.

7. The method of claim 4, wherein the one or more cloud seed pixels are represented in a cloud seed mask and further comprising applying one or more morphological opening operations to the cloud seed mask.

8. The method of claim 4, wherein the one or more candidate cloud pixels are represented in a candidate cloud mask and further comprising applying one or more morphological opening operations to the candidate cloud mask.

9. The method of claim 4, further comprising identifying urban areas within the remote sensing imagery based on deviations in whiteness for each pixel across a time series of images of the geographical area and removing pixels corresponding to the identified urban areas from the one or more candidate cloud pixels.

10. The method of claim 9 further comprising removing pixels corresponding to the identified urban areas from the one or more candidate cloud pixels.

11. A non-transitory computer-readable storage medium storing one or more instructions which, when executed by one or more processors, cause the one or more processors to perform:

receiving remote sensing imagery of a geographical area;

identifying one or more clouds within the remote sensing imagery;

identifying one or more potential shadow pixels within the remote sensing imagery;

for each cloud of the one or more clouds:

determining an optimal height of the cloud based on a geometric relationship between a satellite which captured the remote sensing imagery and a sun and based on the one or more potential shadow pixels determined by calculating an estimated shadow area of the cloud and counting a number of one or more potential shadow pixels that fall within the estimated shadow area; and generating, based on the optimal height, a shadow mask that identifies shadows cast by the one or more clouds within the remote sensing imagery based on the one or more potential shadow pixels identified for each cloud of the one or more clouds.

12. The non-transitory computer-readable storage medium of claim 11, wherein the remote sensing imagery is one or more of: RapidEye satellite imagery or Deimos satellite imagery.

13. The non-transitory computer-readable storage medium of claim 11, wherein the one or more instructions further cause the one or more processors to perform:

displaying the remote sensing imagery with the one or more clouds highlighted based a cloud mask.

14. The non-transitory computer-readable storage medium of claim 13, wherein the cloud mask is generated by:

using a first classifier, identifying one or more cloud seed pixels from the remote sensing imagery based on one or more band values for each pixel;

using a second classifier, identifying one or more candidate cloud pixels from the remote sensing imagery based on the one or more band values for each pixel;

wherein the first classifier favors precision compared to the second classifier and the second classifier favors recall compared to the first classifier;

identifying a set of the one or more candidate cloud pixels that are connected to the one or more cloud seed pixels by one or more of: being a member of the one or more cloud seed pixels, being directly connected to at least one of the one or more cloud seed pixels, or being indirectly connected to at least one of the one or more cloud seed pixels through at least one candidate cloud pixel of the one or more candidate cloud pixels; and generating the cloud mask for the remote sensing imagery based on the set.

15. The non-transitory computer-readable storage medium of claim 14, wherein the optimal height of a cloud is a height which maximizes the one or more potential shadow pixels that fall within the estimated shadow area.

16. The non-transitory computer-readable storage medium of claim 14, wherein the geometric relationship is based on one or more of: sun elevation angle, sun azimuth angle, or satellite off-nadir angle.

17. The non-transitory computer-readable storage medium of claim 14, wherein the one or more cloud seed pixels are represented in a cloud seed mask and further comprising applying one or more morphological opening operations to the cloud seed mask.

18. The non-transitory computer-readable storage medium of claim 14, wherein the one or more candidate cloud pixels are represented in a candidate cloud mask and further comprising applying one or more morphological opening operations to the candidate cloud mask.

19. The non-transitory computer-readable storage medium of claim 14, wherein the one or more instructions further cause the one or more processors to perform:

identifying urban areas within the remote sensing imagery based on deviations in whiteness for each pixel across a time series of images of the geographical area.

20. The non-transitory computer-readable storage medium of claim 19, wherein the one or more instructions further cause the one or more processors to perform:

removing pixels corresponding to the identified urban areas from the one or more candidate cloud pixels.

* * * * *